United States Patent
Tekwani

(10) Patent No.: US 11,032,290 B2
(45) Date of Patent: *Jun. 8, 2021

(54) CONTEXT-BASED ANALYTICS AND INTELLIGENCE

(71) Applicant: Core Mobile Networks, Inc., Campbell, CA (US)

(72) Inventor: Chandra S. Tekwani, San Jose, CA (US)

(73) Assignee: Core Mobile Networks, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,625

(22) Filed: Dec. 13, 2019

(65) Prior Publication Data
US 2020/0304514 A1     Sep. 24, 2020

Related U.S. Application Data

(63) Continuation of application No. 15/169,394, filed on May 31, 2016, now Pat. No. 10,511,609, which is a
(Continued)

(51) Int. Cl.
*H04L 29/06*     (2006.01)
*H04W 12/08*     (2021.01)
(Continued)

(52) U.S. Cl.
CPC ............ *H04L 63/107* (2013.01); *G06F 21/31* (2013.01); *H04L 63/06* (2013.01); *H04L 63/08* (2013.01);
(Continued)

(58) Field of Classification Search
CPC ...................................................... H04L 63/08
See application file for complete search history.

(56) References Cited

U.S. PATENT DOCUMENTS

| 5,974,389 A | 10/1999 | Clark et al. |
| 6,151,601 A | 11/2000 | Papierniak et al. |

(Continued)

FOREIGN PATENT DOCUMENTS

| EP | 1411443 A1 | 4/2004 |
| EP | 2028441 A1 | 2/2009 |

(Continued)

OTHER PUBLICATIONS

"Salesforce Mobile," printed from vvvvvv.salesforce.com/mobile/apps/salesforcemobile/, Internet site, accessed on Dec. 8, 2010, 2 pages.

(Continued)

*Primary Examiner* — Oleg Korsak
(74) *Attorney, Agent, or Firm* — Wilson Sonsini Goodrich & Rosati

(57) ABSTRACT

According to some implementations, context-based information is provided. The method can establish a first context for a user to start a process of correlation of information from multiple sources. The method can then authorize the user to access information from one or more sources of information. The method can request the first information from the one or more sources of information based on the first context. Based on the first information received from the one or more sources of information, the method can revise the first context to generate a second context. The method can use the second context to correlate second information from the one or more sources of information. The method can filter the second information for the user to determine a relevant subset of information. Eventually, the method can send the relevant subset of information to a client device associated with the user.

21 Claims, 12 Drawing Sheets

Related U.S. Application Data continuation-in-part of application No. 14/214,623, filed on Mar. 14, 2014, now abandoned, which is a continuation-in-part of application No. 14/755,510, filed on Jun. 30, 2015, now abandoned, which is a continuation of application No. 14/095,919, filed on Dec. 3, 2013, now Pat. No. 9,071,649, which is a continuation of application No. 12/963,411, filed on Dec. 8, 2010, now Pat. No. 8,606,923.

(60) Provisional application No. 61/383,158, filed on Sep. 15, 2010, provisional application No. 61/780,999, filed on Mar. 14, 2013.

(51) Int. Cl.
*H04W 12/06* (2021.01)
*G06F 21/31* (2013.01)
*H04W 12/63* (2021.01)
*H04W 12/72* (2021.01)

(52) U.S. Cl.
CPC ............ *H04L 63/104* (2013.01); *H04W 12/06* (2013.01); *H04W 12/08* (2013.01); *G06F 2221/2111* (2013.01); *H04W 12/63* (2021.01); *H04W 12/72* (2021.01)

(56) References Cited

U.S. PATENT DOCUMENTS

| | | | |
|---|---|---|---|
| 7,428,494 | B2 | 9/2008 | Hasan et al. |
| 7,493,622 | B2 | 2/2009 | Borkan |
| 7,558,861 | B1 | 7/2009 | Qidwai et al. |
| 7,620,404 | B2 | 11/2009 | Chesnais et al. |
| 8,069,219 | B2 | 11/2011 | Wikman et al. |
| 8,180,376 | B1 | 5/2012 | Merritt |
| 8,606,923 | B2 | 12/2013 | Tekwani |
| 9,071,649 | B2 | 6/2015 | Tekwani |
| 1,027,756 | A1 | 4/2019 | East et al. |
| 1,051,160 | A1 | 12/2019 | Tekwani |
| 2003/0123423 | A1 | 7/2003 | Okanoue |
| 2003/0187984 | A1 | 10/2003 | Banavar et al. |
| 2004/0133848 | A1 | 7/2004 | Hunt et al. |
| 2004/0163373 | A1 | 8/2004 | Adams et al. |
| 2004/0220895 | A1 | 11/2004 | Carus et al. |
| 2005/0154780 | A1 | 7/2005 | Sarja et al. |
| 2005/0163104 | A1 | 7/2005 | Christensen et al. |
| 2005/0171980 | A1 | 8/2005 | Fernandez et al. |
| 2005/0262428 | A1 | 11/2005 | Little et al. |
| 2006/0056351 | A1 | 3/2006 | Wall |
| 2006/0089160 | A1 | 4/2006 | Othmer |
| 2006/0111111 | A1 | 5/2006 | Ovadia |
| 2007/0030824 | A1 | 2/2007 | Ribaudo et al. |
| 2007/0143260 | A1 | 6/2007 | Markov et al. |
| 2008/0037586 | A1 | 2/2008 | Herrero-Veron et al. |
| 2008/0045236 | A1* | 2/2008 | Nahon ............... H04W 4/029 455/456.1 |
| 2008/0049714 | A1 | 2/2008 | Commarford et al. |
| 2008/0196046 | A1 | 8/2008 | Athas et al. |
| 2008/0201452 | A1 | 8/2008 | Athas et al. |
| 2009/0013038 | A1 | 1/2009 | Vogler et al. |
| 2009/0036102 | A1 | 2/2009 | Ho |
| 2009/0063419 | A1 | 3/2009 | Nurminen et al. |
| 2009/0193097 | A1 | 7/2009 | Gassewitz et al. |
| 2009/0204666 | A1 | 8/2009 | Sana et al. |
| 2009/0248693 | A1 | 10/2009 | Sagar et al. |
| 2010/0125604 | A1 | 5/2010 | Martinez et al. |
| 2010/0189004 | A1 | 7/2010 | Mirandette et al. |
| 2010/0229082 | A1 | 9/2010 | Karmarkar et al. |
| 2010/0262487 | A1 | 10/2010 | Edwards et al. |
| 2011/0137741 | A1 | 6/2011 | Omer et al. |
| 2011/0208695 | A1 | 8/2011 | Anand et al. |
| 2011/0238545 | A1 | 9/2011 | Fanaian et al. |
| 2011/0273389 | A1 | 11/2011 | Hibara et al. |
| 2011/0314549 | A1 | 12/2011 | Song et al. |
| 2011/0314558 | A1 | 12/2011 | Song et al. |
| 2012/0023223 | A1 | 1/2012 | Branch et al. |
| 2012/0117232 | A1 | 5/2012 | Brown et al. |
| 2013/0179439 | A1 | 7/2013 | Handman et al. |
| 2013/0185359 | A1 | 7/2013 | Liu et al. |
| 2014/0282915 | A1 | 9/2014 | Tekwani |
| 2015/0081695 | A1 | 3/2015 | Schillings et al. |
| 2016/0014224 | A1 | 1/2016 | Tekwani |

FOREIGN PATENT DOCUMENTS

| | | |
|---|---|---|
| JP | 2007193794 A | 8/2007 |
| WO | WO-9914691 A1 | 3/1999 |
| WO | WO-9960815 A2 | 11/1999 |
| WO | WO-2007102064 A2 | 9/2007 |
| WO | WO-2009056026 A1 | 5/2009 |
| WO | WO-2009084749 A1 | 7/2009 |
| WO | WO-2010088610 A2 | 8/2010 |
| WO | WO-2010148214 A2 | 12/2010 |
| WO | WO-2012037228 A1 | 3/2012 |

OTHER PUBLICATIONS

"ServiceMax for iPad," printed from www.servicemax.com/products/servicemax-for-ipad.html, Internet site, accessed on Dec. 8, 2010, 12 pages.

"Smartphone Mobile Internet Experience Enhancement & Optimization," printed from http://wvvw.novarra.com/solutions/smarter-smadphones/, Internet site, accessed on Dec. 8, 2010, 4 pages.

Cheverst, et al. Exploring context-aware information push.Personal and Ubiquitous computing 6.4 (2002): 276-281.

Hait, Correlating information from multiple records, Nov. 30, 2011, 5 pages.

HHS.gov (Health Information Privacy, Nov. 3, 2003, 2 pages) (Year: 2003).

International Search Report, PCT/US2011/051565, dated Jan. 6, 2012, 3 pages.

U.S. Appl. No. 12/963,411 Notice of Allowance dated Sep. 25, 2013.

U.S. Appl. No. 12/963,411 Office Action dated Feb. 13, 2013.

U.S. Appl. No. 12/963,411 Office Action dated Jul. 17, 2013.

U.S. Appl. No. 14/095,919 Notice of Allowance dated Feb. 10, 2015.

U.S. Appl. No. 14/095,919 Office Action dated Apr. 10, 2014.

U.S. Appl. No. 14/095,919 Office Action dated Oct. 31, 2014.

U.S. Appl. No. 14/214,623 Office Action dated Dec. 30, 2015.

U.S. Appl. No. 14/214,623 Office Action dated May 7, 2015.

U.S. Appl. No. 14/755,510 Office Action dated Feb. 5, 2016.

U.S. Appl. No. 15/169,394 Notice of Allowance dated Aug. 14, 2019.

U.S. Appl. No. 15/169,394 Office Action dated Aug. 24, 2017.

U.S. Appl. No. 15/169,394 Office Action dated Jan. 2, 2019.

U.S. Appl. No. 15/169,394 Office Action dated Jan. 27, 2017.

U.S. Appl. No. 15/169,394 Office Action dated Mar. 8, 2018.

Vicky "Top 5 Types of Communication Network (With Diagram)" 6 pages, retrieved on Aug. 5, 2017.

Written Opinion of International Searching Authority, PCT/US2011/051565 dated Jan. 6, 2012, 6 pages.

* cited by examiner

CONTEXT-BASED ANALYTICS AND INTELLIGENCE

CROSS REFERENCE TO RELATED APPLICATIONS

This application is a continuation of U.S. patent application Ser. No. 15/169,394, filed on May 31, 2016, which is a continuation-in-part of U.S. patent application Ser. No. 14/214,623, filed on Mar. 14, 2014, which claims the benefit of U.S. Patent Provisional Application No. 61/780,999, filed on Mar. 14, 2013. Further, this application is a continuation-in-part of U.S. patent application Ser. No. 14/755,510, filed on Jun. 30, 2015, which is a continuation of U.S. patent application Ser. No. 14/095,919, filed on Dec. 3, 2013, now U.S. Pat. No. 9,071,649, which is a continuation of U.S. patent application Ser. No. 12/963,411, filed on Dec. 8, 2010, now U.S. Pat. No. 8,606,923, which claims the benefit of U.S. Patent Provisional Application No. 61/383,158, filed on Sep. 15, 2010, each of which is entirely incorporated herein by reference.

BACKGROUND

The amount of data is expanding exponentially. For example, the world has crossed the zettabyte barrier in 2010. In 2011, the amount of information created and replicated surpassed 1.8 zettabytes. In 2012, an estimate of 2.5 zettabytes of information was created and replicated across the internet and enterprise systems. It is thus becoming extremely difficult to access just the relevant information among these zettabytes of data.

At the same time, mobile devices (e.g., smartphones, tablets, etc.) are fast becoming popular. Accessing applications from a mobile device rather than a personal computer (PC) may be completely different. A PC has a large screen, is able to bring up a browser, and can display more information. On the other hand, a mobile device has a smaller-size screen than the PC so the amount of information to be displayed on the screen has to be reduced. In addition, the communication link from which PCs and mobile devices communicate with the source of the application and/or the source of the data is also different. For PCs, communication links can be established by high-speed Broadband networks, of which densities are lower and can be easily accessed from a PC with a high capacity processor. For Mobile devices, the network has high densities and is accessed by low capacity processors.

Providing information on mobile devices the same way as on personal computers or laptops may create hinder user's access to information. The lack of ability to open multiple windows and navigate smoothly between multiple windows and shorter attention span due to the nature of using mobile devices may also make it more problematic for a user to access information on mobile devices. Accordingly, there is a need for instantly providing just the relevant information on mobile devices. Users may no longer need to switch between different applications or perform many navigation actions to locate the relevant information.

SUMMARY OF INVENTION

According to some implementations, a method is provided for providing context-based information. The method can establish a first context for a user to start a process of correlation of information from multiple sources. The method can then authorize the user to access information from one or more sources of information. Thereafter, the method can request the first information from the one or more sources of information based on the first context. Based on the first information received from the one or more sources of information, the method can revise the first context to generate a second context. The method can use the second context to correlate second information from the one or more sources of information. Subsequently, the method can filter the second information for the user to determine a relevant subset of information. By filtering the second information for the user, the method can personalize that the second information for the user before it is provided to the user. Eventually, the method can send the relevant subset of information to a client device (e.g., mobile device) associated with the user. Additionally, the method can provide the user with access to an application associated with the relevant subset of information In some implementations, authorizing the user to access information from one or more sources of information comprises applying department-level access policies to authenticate the user. Additionally, for some implementations, authorizing the user to access information from one or more sources of information comprises applying department-level access policies to authorize the user. Depending on the implementation, the one or more sources of information can include enterprise systems, cloud-based sources, social media, IT administration systems, RSS feeds, or a phone system. Additionally, depending on the implementation, the first context can comprise a subject of a calendar entry of the user, an attendee associated to the calendar entry of the user, a GPS location of the client device, a caller identification of an incoming phone call to the client device, a caller identification of an outgoing phone call to the client device, information regarding a web conference, financial information regarding a market being tracked by the user, or a to do list.

Particular implementations provide a method for instant access to relevant information on smartphones, tablets, laptops and desktop computers based on: (a) a user's context based on a task the user is performing, which may be determined based on information in their calendar or task scheduler; (b) a user's context based on who the user is meeting as determined by attendees of meeting in user's calendar; (c) a user's context based on their physical location as determined from the GPS location of their mobile device; (d) a user's context determined by an incoming phone call on their mobile device or landline telephone connected to an enterprise phone system; (e) a user's context as determined by the user initiating a phone call from their mobile device or landline telephone connected to enterprise PBX; (f) a user's context determined by signing onto online meeting like WebEx® or GoToMeeting®; (g) a user's context determined by market indices that the user is tracking or events that the user is tracking explicitly.

Particular implementations provide for extraction of the relevant information from enterprise systems, such as CRMs, ERPs, SOPs, EMRs, based on a user's context determined. For some implementations, access to such enterprise systems complies to a user's authentication and authorization to access that information.

Particular implementations provide for extraction of relevant information from other enterprise systems, cloud based services, RSS feeds and social media by either using the same context or revising the context based on information received from one or more enterprise systems.

Particular implementations provide for context-based correlation of information information in enterprise systems, cloud based services, social media and RSS feeds with news and stock & securities quotes.

Particular implementations provide for enterprise IT administrator to manage users, assign users to departments, assign a set of enterprise applications, cloud based services, social media and RSS feeds to each department. In some implementations, a default subset of relevant information is configured for each user in a certain department.

Particular implementations provide for personalization of correlated information by a user, which can comprise the user specifying the relevant subset of information based on fields available in enterprise systems, cloud based services, social media and RSS feeds.

Particular implementations provide a mechanism to push the relevant correlated information from enterprise systems, cloud based services, social media and RSS feeds to smartphones, tablets, laptops and desktops such that user has instant access to this information.

In one implementation, prime brokerage sales professionals get instant access to information from enterprise systems (e.g., SOPs, such as UBSs, NEOs, Morgan Stanley Matrix, and JP Morgan JPMM). Information can include user calendars, phone calls, market indices, and the like. For some implementations, sales professionals make updates on the enterprise system right from the user device without entering credentials or looking for right place to input the updates.

In another implementation, broker dealers are provided with research reports, recent transactions, and other relevant information before executing a transaction on their smartphones, tablets and laptops.

In another implementation, a wealth manager track market indices and get information of clients affected by a stock price change or market index change. Such information can be pushed to mobile device with instructions on what to do next and perform transactions on mobile device.

In another implementation, a wealth manager receives a call on his office phone line and (e.g., subsequently) receives that a client portfolio associated with the person calling on one their user devices (e.g., smart phone, tablet, laptop or desktop), possibly within a few seconds of phone call or before the call completes.

In another implementation, a portfolio manager receives instant access to a client's portfolio standing, on their mobile device before (e.g., right before) a meeting or as soon as he enters their client's office.

In another implementation, a physician receives instant access to patient information (e.g., symptoms, history of visits, drug information and immunization information) from multiple electronic records when the patient contacts physician's office (e.g., email or phone call).

In another implementation, a physician who visits multiple hospitals receives access to patient records at a given hospital on his user device (e.g., tablet or smartphone) as soon as, or soon after, the physician enters the given hospital.

In another implementation, an emergency care provider or urgent care provider receives instant access to patient information from a given hospital or other hospitals in the vicinity to where the care provider is currently located.

In another implementation, a registered investment advisor receives instant access to information of their client before a meeting. For some implementations, client information is obtained from CRM, portfolio standings relevant to the client, information about the client from social media, or the latest info about the client.

DETAILED DESCRIPTION

Figure 1:
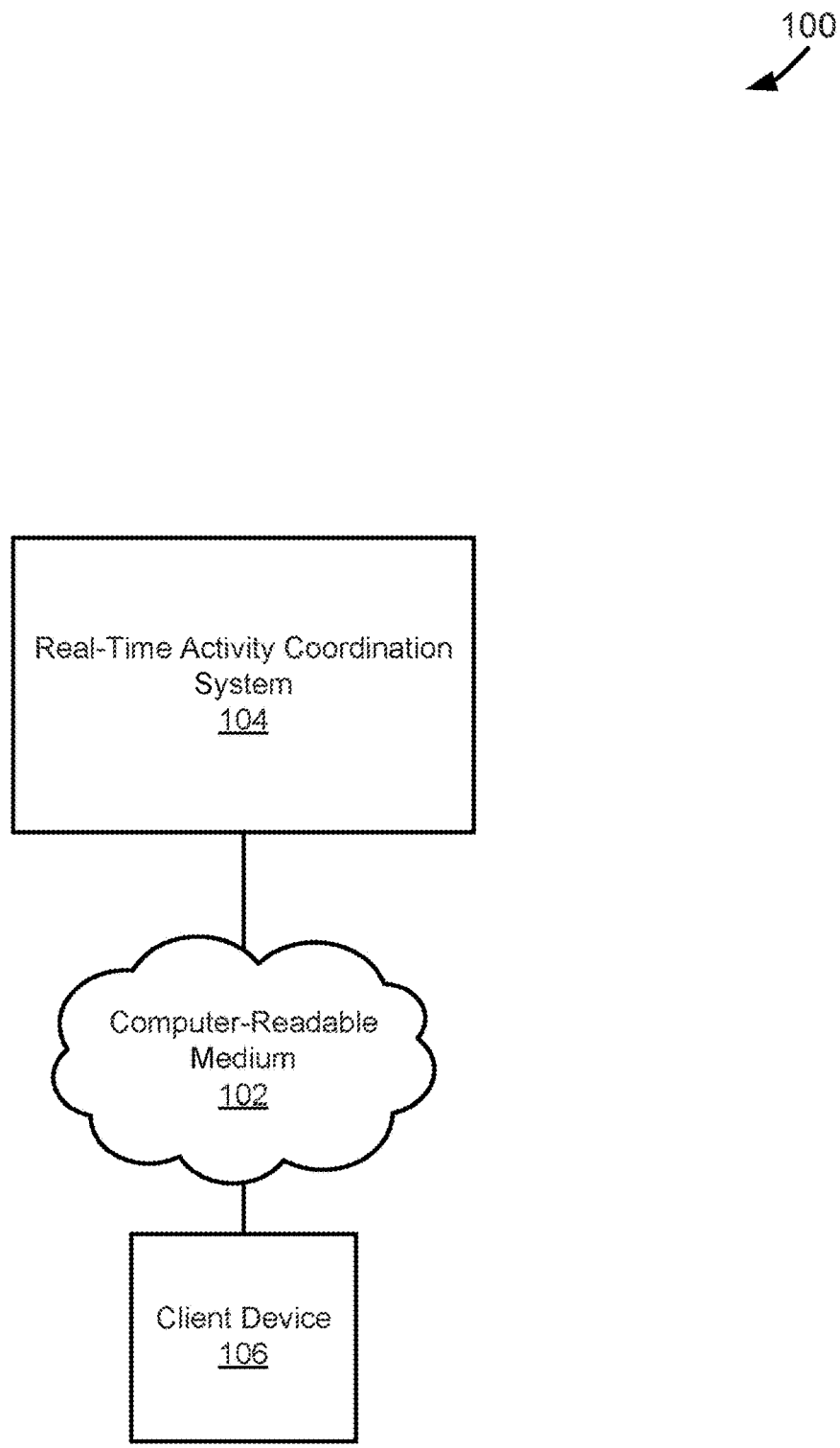
FIG. 1 depicts a diagram of an example of a system for coordinating activities in real-time.

Various implementations relate to providing context-based analytics for financial information, which can facilitate trading (e.g., stocks and other equities) using mobile devices. In particular implementations, context-based analytics facilitate real-time, algorithmic financial trading using mobile devices. Some implementations provide access to the relevant financial analytics or intelligence (in real-time) by correlating information across enterprise systems, cloud-based services, social media, equity analytics tools, and other sources of information (e.g., equity. Other sources of information can include information generated by analysis and screening of multiple complex parameters after back-testing and equity strategy simulations. Certain implementations enable financial advisors and investment managers to perform algorithmic trading for clients from their mobile devices in real time. For some implementations, relevant financial intelligence is based on a user's (e.g., financial advisor's) context, such as their calendar, location, phone calls, market trackers, to-do list, client spending tracker, or portfolio trackers. Depending on the implementation, access, retrieval, transmission, or storage of financial information from sources can be in regulatory compliance (e.g. FTC, SEC, etc.).

Various implementations relate to workflows in different industries, including healthcare. In certain implementations, context-based analytics or intelligence is obtained from healthcare-related information to facilitate or improve coordination of health providers, increased healthcare treatment efficiency, expanded healthcare capacity (e.g., care for more patience), or improved patient outcomes. In some implementations, context-based analytics or intelligence in healthcare is obtained by correlating relevant patient information from multiple clinical and business systems. Some implementations enable a healthcare provider to update a treatment checklist, or enable a healthcare provider to input relevant clinical information (e.g., regard a patient) in real time from a mobile device. Context-based analytics can further facilitate real time coordination between members of a care provider team and patient/patient's relatives. For specific implementations, historical and predictive analytics are utilized in the context-based analytics and intelligence to do improve efficiency and increase capacity. Depending on the implementation, access, retrieval, transmission, or storage of healthcare information from sources can be in regulatory compliance (e.g., HIPAA).

Certain implementations used in healthcare (e.g., proprietary) services improve coordination amongst staff and patients and improve efficiency, such as by implementing LEAN management techniques into the context-based analytics. Various implementations facilitate communication and coordination between medical practitioners (e.g., physicians) and healthcare administration members during patient treatment (e.g., in out-patient settings). Specific implementations used for emergency rooms improve door-to-doc and door-to-door timings for treatment, improve efficacy of treatment, and increase overall healthcare capacity and utilization.

Various implementations relate to providing relevant, context-based business analytics and intelligence. In some implementations, context-based analytics and intelligence for business information is obtained by correlating big-data business analytics, cloud-based services and existing enterprise applications (e.g., SAP AG providing enterprise software). For certain implementations, context-based business analytics and intelligence is used for workflow for financial services professionals, healthcare providers, information technology professionals, manufacturing, or supply chains management professionals and sales and customer service professionals. In some implementations, context-based business analytics and intelligence is provided to a user when the user is scheduling meetings in their calendar, or receiving a call. Certain implementations provide context-based business analytics and intelligence useful in informed decision-making and instant knowledge transfer to users and clients. Various implementations shorten time to service a client, shorten time to solve a problem client issue, provide improved ROI for enterprise investment in systems and applications, or allow IT applications to be extended to the mobile device.

FIG. 1 depicts a diagram 100 of an example of a system for coordinating activities in real-time. The system of the example of FIG. 1 includes a computer-readable medium 102, a real-time activity coordination system 104, and a client device 106.

The real-time activity coordination system 104 and the client device 106 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, real-time activity coordination system 104, the client device 106, and other applicable systems, or devices described in this paper can be implemented as a computer system or parts of a computer system or a plurality of computer systems. A computer system, as used in this paper, can include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific or other considerations, an engine can be centralized or its functionality distributed. An engine can be a specific purpose engine that includes specific purpose hardware, firmware, or software embodied in a computer-readable medium for execution by the processor. The processor transforms data into new data using implemented data structures and methods, such as is described with reference to the Figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the real-time activity coordination system 104 functions to coordinate activities by sending and receiving data to and from client devices (e.g. client device 106) of users who carry out, or otherwise take part in, the coordinated activities. Depending upon implementation-specific or other considerations, the real-time activity coordination system 104 can coordinate activities related to health care. For example, activities coordinated by the real-time activity coordination system 104 can include examining a patient, diagnosing a patient, administering anesthesia to a patient, performing pre-operation activities in preparing a patient for surgery, performing surgery on a patient, and performing post-operation activities after a patient has had surgery.

In a specific implementation, the real-time activity coordination system 104 functions to generate a workflow of activities coordinated by the real-time activity coordination system 104. Depending upon implementation-specific or other considerations, the real-time activity coordination system 104 can create a workflow for activities undertaken in relation to healthcare. For example, the real-time activity coordination system 104 can create a workflow that includes, examining a patient to diagnose a condition, preparing the patient for surgery, administering anesthesia to the patient, performing surgery on the patient, and performing post-operation activities on the patient.

In a specific implementation, the real-time activity coordination system 104 functions to acquire data from various applicable systems. The real-time activity coordination system 104 can acquire data from client devices. For example, the real-time activity coordination system 104 can acquire data specifying that a patient has been checked in from a healthcare provider responsible for checking in a patient. The real-time activity coordination system 104 can also acquire data from systems or datastores external to the real-time activity coordination system 104. For example, the real-time activity coordination system 104 can acquire patient data for a patient from a previous hospital at which the patient visited. Depending upon implementation-specific or other considerations, data acquired by the real-time activity coordination system 104 can be used to generate a workflow that includes activities to be performed. For example, the real-time activity coordination system 104 can generate a workflow based on data identifying a diagnosis of a patient acquired from a client device used by the doctor.

In a specific implementation, the real-time activity coordination system 104 can acquire data indicating the completion of activities in a workflow as activities in the workflow are completed. Depending upon implementation-specific or other considerations, data indicating the completion of activities in a workflow from client devices of users who are actually performing the activities. For example, if a healthcare provider has completed performing pre-operation procedures on a patient, then the healthcare provider can input into a client device that they have completed performing the pre-operation procedures, and the real-time activity coordination system 104 can acquire data from the client device indicating that the pre-operation procedure has been performed.

In a specific implementation, the real-time activity coordination system 104 functions to determine which data is relevant to push to specific users based on a context of the data. Depending upon implementation-specific or other considerations, a context of data can include the identification of a person for whom activities are being performed and the characteristics of the activities being performed. For example, the context of data can include be based on a patient for which the acquired data is related. Specifically, if the data is a patient record for a patient, then the context can be an identification of the patient.

In a specific implementation, the real-time activity coordination system 104 functions to determine which data is relevant to push to specific users based on a context of a specific user. Depending upon implementation-specific or other considerations, a context of a specific user can include the identification of the user, the characteristics, specialties, or talents of a specific user, and the location of the specific user. For example, if a user is a doctor that is located on premises, the real-time activity coordination system 104 can push data to the doctor based on the fact that the doctor is on the premises. In another example, if a user is a doctor that specialized in a specific type of surgery that needs to be performed on a patient, then the real-time activity coordination system 104 can push data to the doctor about the patient based on the fact that the doctor specialized in the specific type of surgery that needs to be performed.

In a specific implementation, the real-time activity coordination system 104 functions to determine which data is relevant to push based on a context of a person for whom activities are being performed. Depending upon implementation-specific or other considerations, a context of a person for whom activities are being performed can include, the identification of the person, the location of the person, and the types of activities that are being performed for the person. For example, if the person is a patient who is currently located at a hospital, then the real-time activity coordination system 104 can push data to users associated with the hospital, such as doctors and nurses. In another example, if person is a patient for whom a specific operation will be performed, then the real-time activity coordination system 104 can push data to doctors who specialized in the specific operation that will be performed on the person.

In a specific implementation, the real-time activity coordination system 104 functions to determine what data to push to a user based on context and pushes the data to the user in real-time as the data is acquired. In one example, the real-time activity coordination system 104 determines what data to push to a user based on a context of data that is acquired in real-time as the data is acquired. In another example, the real-time activity coordination system 104 determines what data to push to a user based on a context of the user in real-time as the data is acquired. In a further example, the real-time activity coordination system 104 determines what data to push to a user based on a context of a user for whom activities are to be performed in real-time as the data is acquired.

In a specific implementation, the client device 106 functions to receive data pushed to a user by the real-time activity coordination system 104. In one example, a user uses the client device 106 to receive and view information pushed by the real-time activity coordination system 104. For example, if a user is a doctor, then the doctor can use the client device 106 to receive and view information related to a patient that has been assigned to a doctor. The client device 106 can be a mobile device that receives data through a wireless network to which the client device 106 is coupled. Additionally, the client device 106 can be a thin client or an ultra-thin client.

In a specific implementation, the client device 106 functions to generate data that the real-time activity coordination system 104 acquires based on input from a user. The client device 106 can be used by a user to input and subsequently generate data regarding data pushed to the user by the real-time activity coordination system 104. The data generated by the client device 106 can include data regarding the completion of activities by a user of the client device 106. For example, the data generated by the client device 106 can include that a healthcare provider has completed pre-operation activities for a patient.

Figure 2:
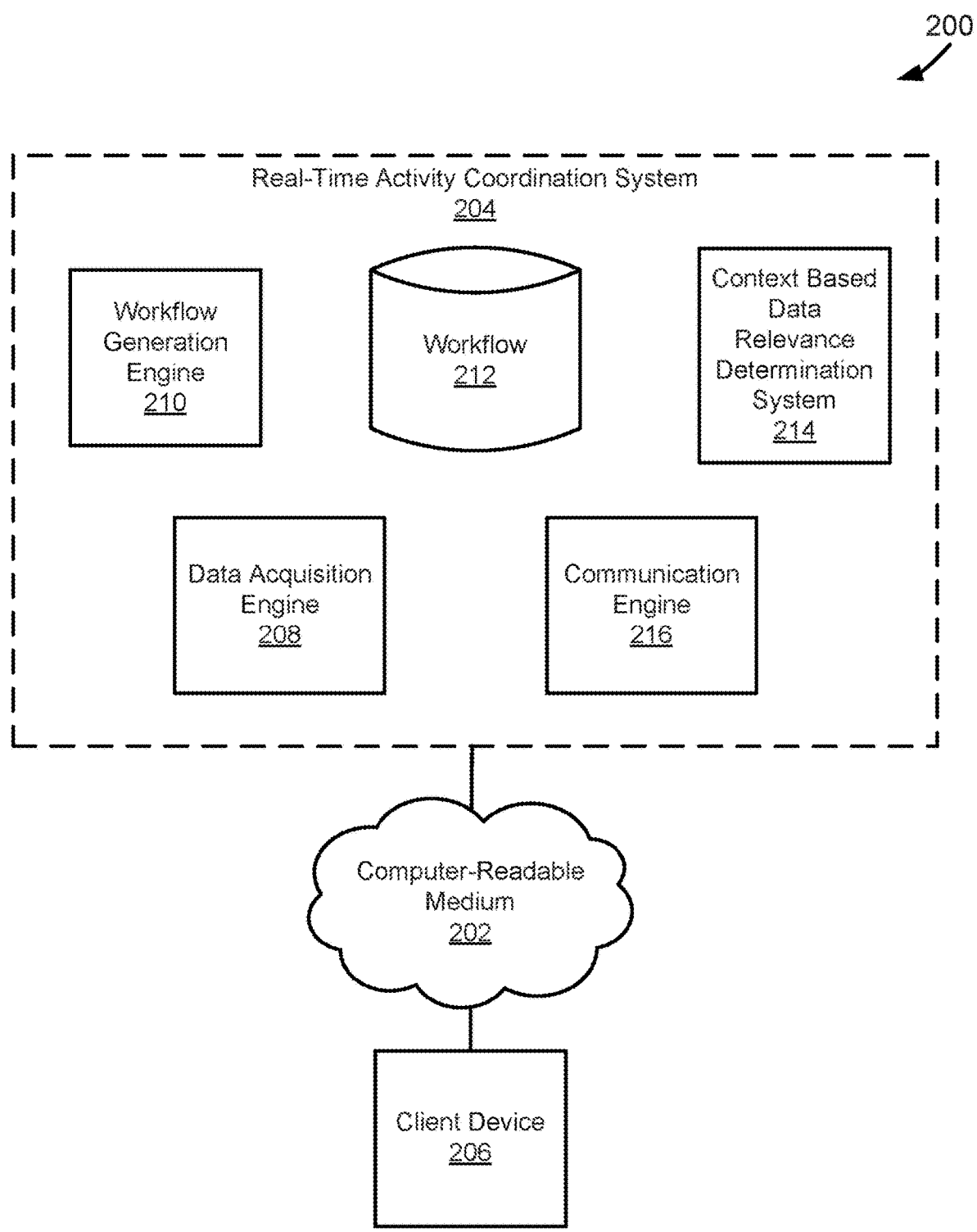
FIG. 2 depicts a diagram of a system for coordinating activities in real-time by acquiring and pushing data to users based on context.

FIG. 2 depicts a diagram 200 of a system for coordinating activities in real-time by acquiring and pushing data to users based on context. The example system shown in FIG. 2 includes a computer-readable medium, a real-time activity coordination system 204, and a client device 206. In the example system shown in FIG. 2, the real-time activity coordination system 204 and the client device 206 are coupled to each other through the computer-readable medium 202.

In a specific implementation, the real-time activity coordination system 204 functions according to an applicable system for coordinating activities in real-time, such as the real-time activity coordination systems described in this paper. In coordinating activities in real-time, the real-time activity coordination system 204 can generate a workflow of the activities. Further, in coordinating activities in real-time, the real-time activity coordination system 204 can acquire and push data to users based on context.

In a specific implementation, the client device 206 functions according to an applicable device for sending and receiving data, such as the client devices described in this paper. As part of the client device 206 sending data, the real-time activity coordination system 204 can acquire data from the client device 206. As part of the client device 206 receiving data, the real-time activity coordination system can push data to the client device 206.

In the example system shown in FIG. 2, the real-time activity coordination system 204 includes a data acquisition engine 208, a workflow generation engine 210, a workflow datastore 212, a context based data relevance determination system 214, and a communication engine 216. In a specific implementation, the data acquisition engine 208 functions to acquire data from applicable systems or devices. In acquiring data, the data acquisition engine 208 can acquire data from systems external to the real-time activity coordination system 204 or the organization using the real-time activity coordination system 204. For example, the data acquisition engine 208 can collect patient records from another hospital that a patient previously visited. In another example, the data acquisition engine 208 can collect patient insurance information from an insurer of a patient. Further in acquiring data, the data acquisition engine 208 can acquire data from client devices (e.g. client device 206) that are coupled to the real-time activity coordination system 204. In acquiring data from a client device 206, the data acquisition engine 208 can acquire data indicating that a user has completed an activity. For example, the data acquisition engine 208 can acquire data from a client device 206 indicating that a healthcare provider who uses the client device 206 has completed performance of pre-operation activities on a patient.

In a specific implementation, the workflow generation engine 210 functions to generate a workflow. A workflow generated by the workflow generation engine 210 can include the activities that need to be performed and the order in which the activities need to be performed in achieving a goal. The workflow generation engine 210 can generate a workflow based on data acquired by the data acquisition engine 208. For example, the data acquisition engine 208 can acquire data indicating that a patient has checked in, and the workflow generation engine 210 can generate a workflow to diagnose the patient. In another example, the data acquisition engine 208 can acquire data indicating a diagnosis of a patient, and the workflow generation engine can generate a workflow of activities that need to be performed based on the diagnosis of the patient.

In a specific implementation, the workflow datastore 212 functions to store workflows. The workflow datastore 212 can store workflows generated by the workflow generation engine 210. Workflows stored in the workflow datastore 212 can include activities that need to be performed in achieving a common goal and the order in which the activities need to be performed. Workflows stored in the workflow datastore 212 can also include users assigned to complete or participate in activities performed in achieving a common goal.

In a specific implementation, the context based data relevance determination system 214 functions to determine which data is relevant to specific users based on a context of the specific users. Depending upon implementation-specific or other considerations, the context based data relevance determination engine 214 can determine which data acquired by the data acquisition engine 208 is relevant to specific users based on a context of the specific users. Further depending upon implementation-specific or other considerations, the context based data relevance determination engine 214 can determine which data generated by the real-time activity coordination system 204, such as data about a workflow generated by the workflow generation engine 210, is relevant to specific users based on a context of the specific users. In determining which data is relevant to specific users based on a context of the specific users, the context based data relevance determination system 214 can use the characteristics of a specific user to determine which data is relevant to the specific user. For example, if a user is a doctor who specializes in a procedure to be performed on a patient, then the context based data relevance determination system 214 can determine that data related to the patient is relevant to the doctor. Further in determining which data is relevant to specific users based on a context of the specific users, the context based data relevance determination system 214 can use the identity of a specific user to determine which data is relevant to a specific user.

In a specific implementation, the context based data relevance determination system 214 functions to determine which data is relevant to specific users based on a context of a person for whom activities are being performed. Depending upon implementation-specific or other considerations, the context based data relevance determination engine 214 can determine which data acquired by the data acquisition engine 208 is relevant to specific users based on a context of a person for whom activities are being performed. Further depending upon implementation-specific or other considerations, the context based data relevance determination engine 214 can determine which data generated by the real-time activity coordination system 204, such as data about a workflow generated by the workflow generation engine 210, is relevant to specific users based on a context of a person for whom activities are being performed. In determining which data is relevant to specific users based on a context of a person for whom activities are being performed, the context based data relevance determination system 214 can use the location of a person for whom activities are being performed to determine which data is relevant to a specific user. For example, if a person for whom activities are being performed is located in a hospital, then the context based data relevance determination system 218 can determine that data about the person is relevant to doctors and healthcare providers associated with the hospital. Further in determining which data is relevant to specific users based on a context of a person for whom activities are being performed, the context based data relevance determination system 214 can use the characteristics of the activities that are or will be performed to determine which data is relevant to a specific user. For example, if a person will have a specific operation performed on them, then the context based data relevance determination system 214 can determine that data about the person is relevant to doctors and healthcare providers who specialize in the specific operation.

In a specific implementation, the communication engine 216 functions to push data to client devices (e.g. client device 206). In pushing data to client devices, the communication engine 216 can push data based on a determination of what data is relevant to specific users made by the context based data relevance determination system 214. Further in pushing data to client devices, the communication engine 216 can push data to client devices that are associated with or used by specific users for whom the context based data relevance determination system 214 determines data is relevant. For example, if the context based data relevance determination system 214 determines that patient information is relevant to a doctor, then the communication engine 216 can push the patient information to a client device used by or associated with the doctor. The communication engine 216 can push acquired data to client devices in real-time as it is acquired by the data acquisition engine 208. Additionally, the communication engine 216 can push data generated by the real-time activity coordination system 204 to client devices in real-time as the data is generated. For example, the communication engine 216 can push data related to workflows generated by the workflow generation engine 210 to client devices as the data related to workflows is generated by the workflow generation engine 210.

Figure 3:
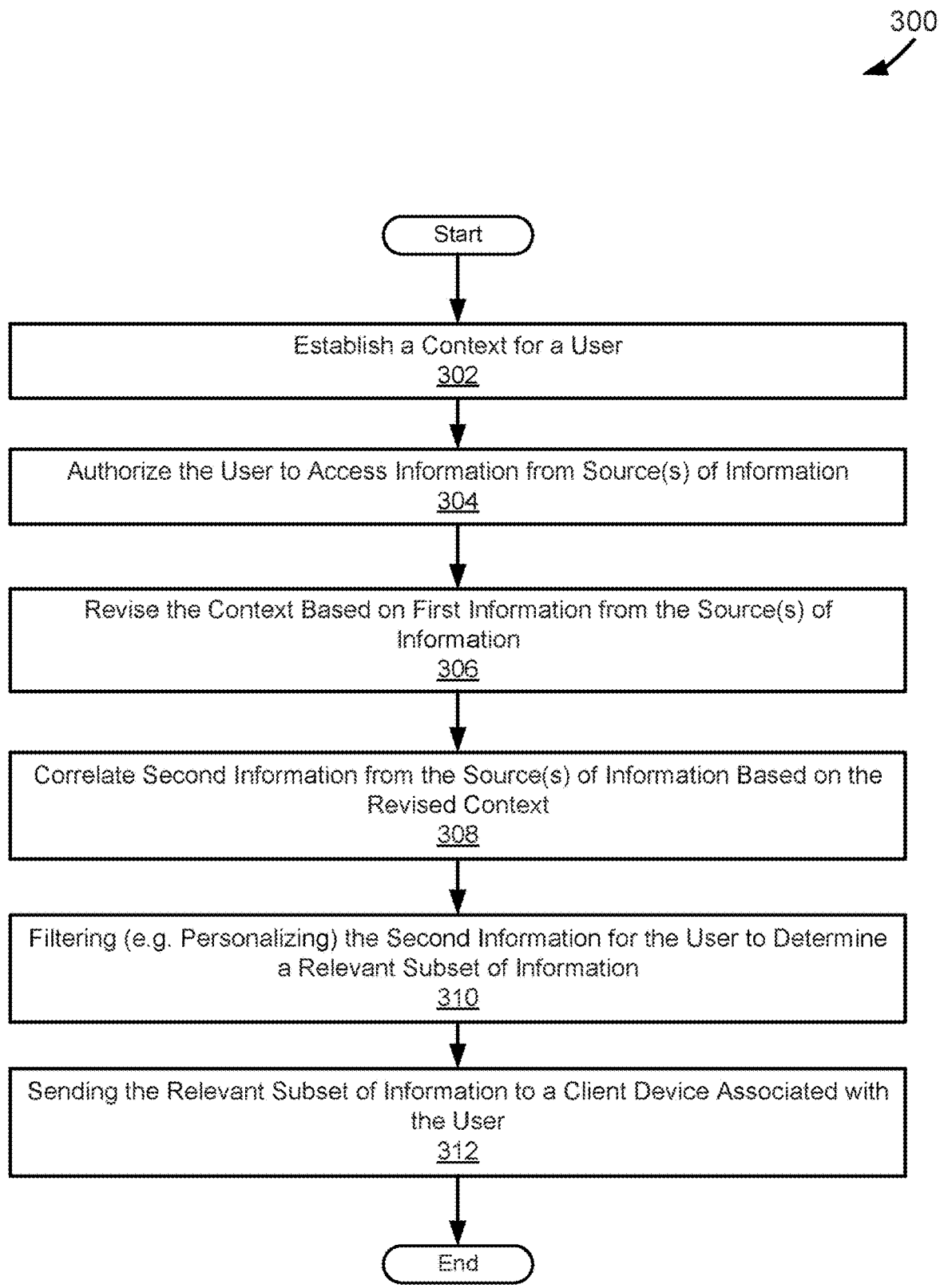
FIG. 3 depicts a flowchart of an example of a method for providing context based information.

FIG. 3 depicts a flowchart 300 of an example of a method for providing context based information. The example flowchart 300 begins at module 302, where a context of a user is established. A context can be an applicable characteristic or characteristic of a setting of a user. For example, if a user is a patient who checks into a hospital, then a context of the user can be that the user just checked into a hospital. Additionally, a context can be a particular interest to a user. In another example, if a user is tracking a certain stock, then a context can be the price of a stock at a given time.

The flowchart 300 continues to module 304, where the user is authorized to access information from one or a plurality of sources of information. The flowchart 300 continues to module 306, where the context established for the user at module 302 is revised based on first information from the one or a plurality of sources of information. The flowchart 300 continues to module 308, where second information is correlated from the one or a plurality of sources of information based on the revised context. The flowchart 300 continues to module 310, where the second information is filtered, e.g. personalized, for the user to determine a relevant subset of information. The flowchart 300 continues to module 312, where the relevant subset of information, determined at module 310, is sent to a client device associated with the user.

The example flowchart 300 optionally continues to module 304, where data related to a workflow is generated based on the acquired data. Data related to a workflow can include the activities that need to be performed and the order in which the activities need to be performed. In one example, data related to a workflow can include healthcare activities that need to be performed on a patient based on a diagnosis of the patient. Specifically, if data acquired at module 302 is a diagnosis of a patient, then data related to a workflow that includes the activities that need to be performed based on the diagnosis of the patient can be generated.

The example flowchart 300 continues to module 306, where it is determined which data is relevant to a specific user based on context. The data that is determined to be relevant or not can be either or both data related to activities to be performed that is acquired at module 302, or data related to a workflow generated at module 304. Depending upon implementation-specific or other considerations, it is determined which data is relevant to a specific user based on a context of a specific user. For example, if a user specializes in an operation to be performed on a patient, then data related to the patient is determined to be relevant. Further depending upon implementation-specific or other considerations, it is determined which data is relevant to a specific user based on a context of a person for whom activities are being performed. For example, if a person has been checked into a hospital to meet with a doctor, then data about the patient can be determined to be relevant to doctors and healthcare providers associated with or in the hospital.

The example flowchart continues to module 308, where relevant data is pushed to specific users. Data is determined to be relevant to specific users at module 306 based on context. In pushing relevant data to specific users, the relevant data can be sent to a client device associated with or used by a specific user. For example, if the specific user is a doctor, then the relevant data can be sent to a mobile device, such as a smart phone, used by or associated with the doctor.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

Figure 4:
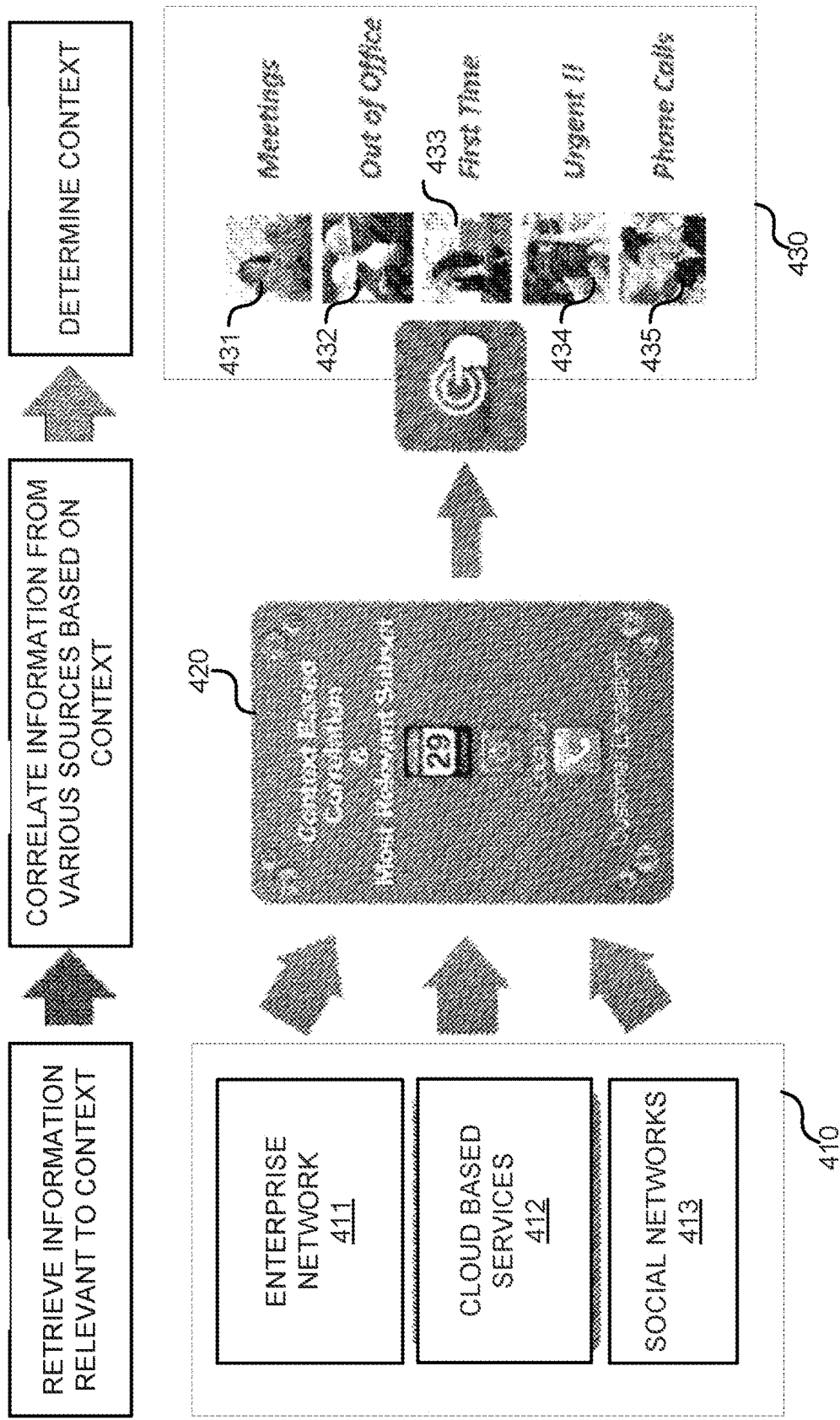
FIG. 4 is a diagram depicting an example of a method for correlating information from one or more sources based on a context of a user in accordance with an exemplary embodiment of the present application.

FIG. 4 is a diagram depicting an example of a method for correlating information from one or more sources 410 based on a context 430 of a user in accordance with an exemplary embodiment of the present application. In various implementations, a context 430 of a user can be determined in real time. Further in various implementations, a context 430 can describe a setting in which a user accesses information.

Depending upon implementation-specific or other considerations, a context may be an applicable type of context such as location, or a calendar entry of a mobile device. For example, a meeting 431 in a user's calendar may have an associated subject, which may be used to determine a context. Further depending upon implementation-specific or other considerations, an out of office 432 entry can related to a subject that is used to determine a context. For example, an out of the office 432 entry in a user's calendar may describe an event that a user is attending, which may be used to determine a context. Depending upon implementation-specific or other considerations, an incoming or outing call 433 that is the first time call for a user can be used to determine a context. Further depending upon implementation-specific or other considerations, an urgent outgoing call 434 can be used to determine a context. Depending upon implementation-specific or other considerations incoming or outgoing calls 435 may be used to determine a context.

In a specific implementation, a user's context can be determined dynamically based on data from multiple sources such as software-as-a-service (SaaS). A context can be determined based on a user's calendar, task scheduler, GPS, phone system (e.g., mobile, home landline, office landline, etc.), conference (e.g., webex), and/or users internet behavior (e.g., market indices that a user tracks, or events that a user tracks). For example, a context can be determined from a subject line of a calendar entry, attendees of a meeting entry on the user's calendar, a GPS location of a user's mobile device (e.g., cellphone, tablet, or laptop), the caller ID of the caller in an incoming call to the user's phone (e.g., cellphone, home landline, or office landline), details of a web meeting or a teleconference that a user is participating, and/or a user's Internet behavior.

Information that is relevant to a context may be extracted from various sources including enterprise systems such as a customer relationship management (CRM), an enterprise resource planning (ERP), a single dealer platform (SDP), or an Electronic Medical Record (EMR) system. As illustrated, information based on the context 430 may be retrieved from enterprise networks 411, cloud based services 412, and/or social networks 413. Information retrieval from enterprise networks 411, cloud based services 412, and/or social networks 413 is subject to a user's authentication and authorization.

In various embodiments, information retrieved from one or more sources is correlated based on context. Information retrieved from various sources is correlated based on a context. The context-based subset of information may be provided to the user. The subset of the correlated information may be display on a mobile device (e.g., a smartphone, a tablet device, or a laptop) in a manner that it can be displayed on a smaller screen. Additionally, from information correlated based on context, a context can be determined.

Figure 5:
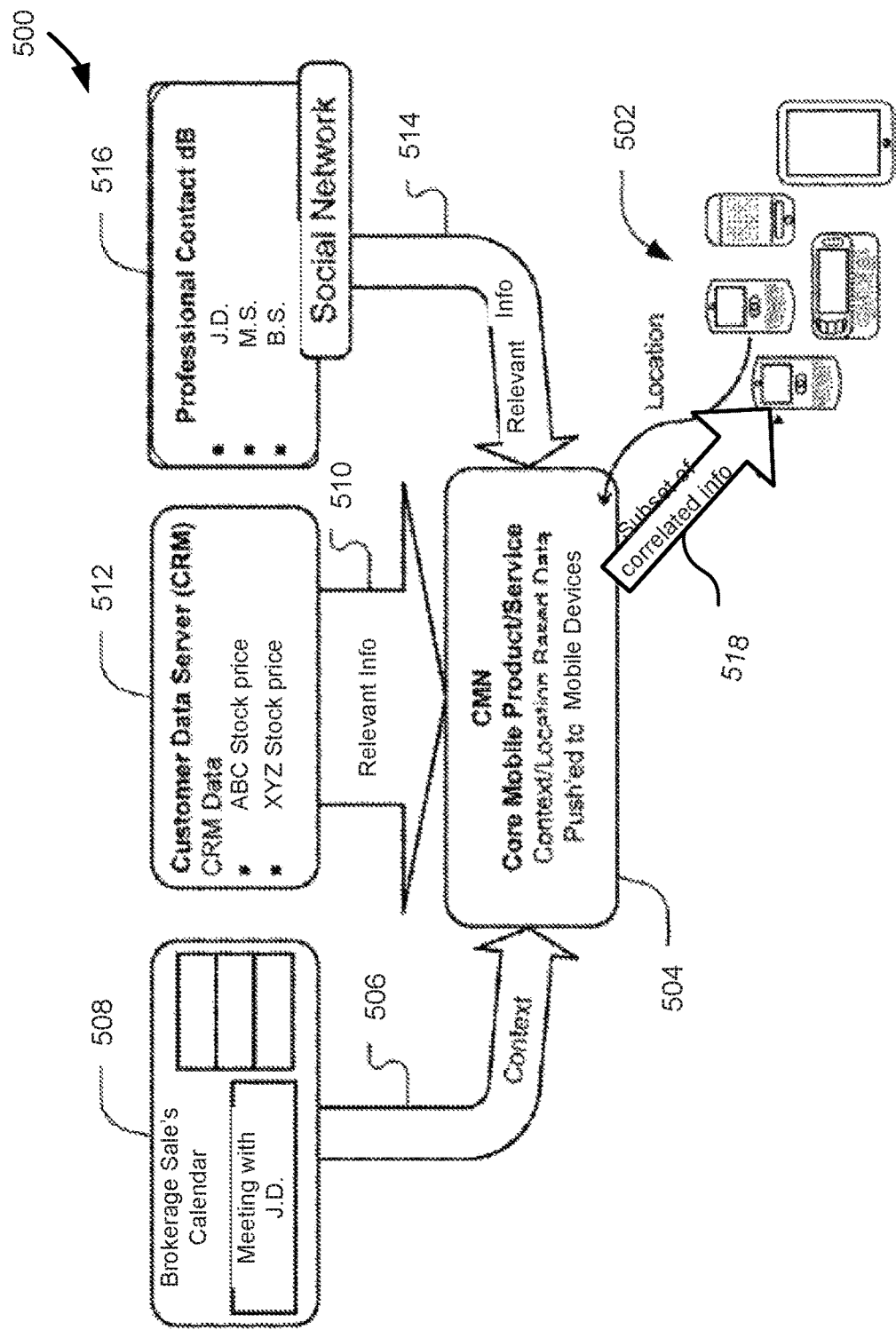
FIG. 5 illustrates a diagram of a system for real time providing of context based information for use in a field sales application according to the disclosed embodiments.

FIG. 5 illustrates a diagram 500 of a system for real time providing of context based information for use in a field sales application according to the disclosed embodiments. In the example system illustrated in FIG. 5, a method is directed to provide real time context based information in a sales leads and customer relationship management application where information to be pushed to a mobile device 502 is based on calendar entry in enterprise exchange server or mobile device 502 or location of the mobile device 502 spanning all current and adjacent zip codes. According to one aspect, the system is directed to a field sales application where a mobile product service application 504 in a core mobile network determines a context 506 based on a calendar entry 508 and determines relevant information 510 from a customer data server 512 and/or relevant information 514 from a professional contacts database 516. In one embodiment, the relevant information 510 and 514 is determined based on the context 506. In another embodiment, the relevant information 510 is determined based on the context 506. The context 506 may be updated by using the relevant information 510 and the updated context may be used to determine the relevant information 514.

The mobile product service application 504 comprises a context based correlation engine (e.g., module) to correlate the relevant information 510, 514 based on the context 506 match between the multiple data systems 512, 516. In one aspect, the correlated data may be entered (e.g., stored) in a database. When a match for push criteria exists, the mobile product service application 504 provides a subset of the correlated information 518 to the mobile device 502 using a push delivery engine. The subset of the correlated information 518 may be pushed as specified in the push mechanism. A user may personalize the subset of the correlated information 518 being provided on the mobile device 502. The personalization may be based on fields available in the source (e.g., enterprise systems, cloud based services, social media and/or RSS feeds) from which the relevant information 510 and 514 is retrieved.

In one aspect, a method is directed for brokerage sales professionals to have instant access to information on enterprise systems 512 (e.g., SDPs such as UBS NEO, Morgan Stanley Matrix, and JP Morgan JPMM) based on calendar, phone calls and/or market indices using the mobile device 502. In one aspect, a method is directed for brokerage sales professionals to make updates on the enterprise system 512 from the mobile device 502. A brokerage sales professional does not even need to enter credentials or look for the right place to input the updates.

In various embodiments, the mobile device 502 may be implemented as a handheld portable device, computer, mobile telephone, sometimes referred to as a smartphone, tablet personal computer (PC), kiosk, desktop computer, or laptop computer, or any combination thereof. Examples of smartphones include, for example, Palm® products such as Palm® Treo® smartphones, Blackberry® smart phones, Apple® iPhone®, and the like. Although some embodiments of the mobile device 502 may be described with a mobile or fixed computing device implemented as a smart phone, personal digital assistant, laptop, desktop computer by way of example, it may be appreciated that the embodiments are not limited in this context. For example, a mobile computing device may comprise, or be implemented as, any type of wireless device, mobile station, or portable computing device with a self-contained power source (e.g., battery) such as the laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. A fixed computing device, for example, may be implemented as a desk top computer, workstation, client/server computer, and so forth.

In various embodiments, the mobile device 502 may provide voice and/or data communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, WiMAX (Worldwide Interoperability for Microwave Access, LTE (Long Term Evolution) and so forth.

In various embodiments, the mobile device 502 may be configured to provide voice and/or data communications functionality in accordance with different types of wireless network systems or protocols. Examples of suitable wireless network systems offering data communication services may include the Institute of Electrical and Electronics Engineers (IEEE) 802xx series of protocols, such as the IEEE 802.1a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile device 502 may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

In various embodiments, the mobile device 502 is configured to couple to a communication interface to access the cloud (Internet). The communication interface may form part of a wired communications system, a wireless communications system, or a combination of both. For example, the mobile device 502 may be configured to communicate information over one or more types of wired communication links such as a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The mobile device 502 may be arranged to communicate information over one or more types of wireless communication links such as a radio channel, satellite channel, television channel, broadcast channel infrared channel, radio-frequency (RF) channel, WiFi channel, a portion of the RF spectrum, and/or one or more licensed or license-free frequency bands. In wireless implementations, the mobile device 502 may comprise one more interfaces and/or components for wireless communication such as one or more transmitters, receivers, transceivers, amplifiers, filters, control logic, wireless network interface cards (WNICs), antennas, and so forth.

Figure 6:
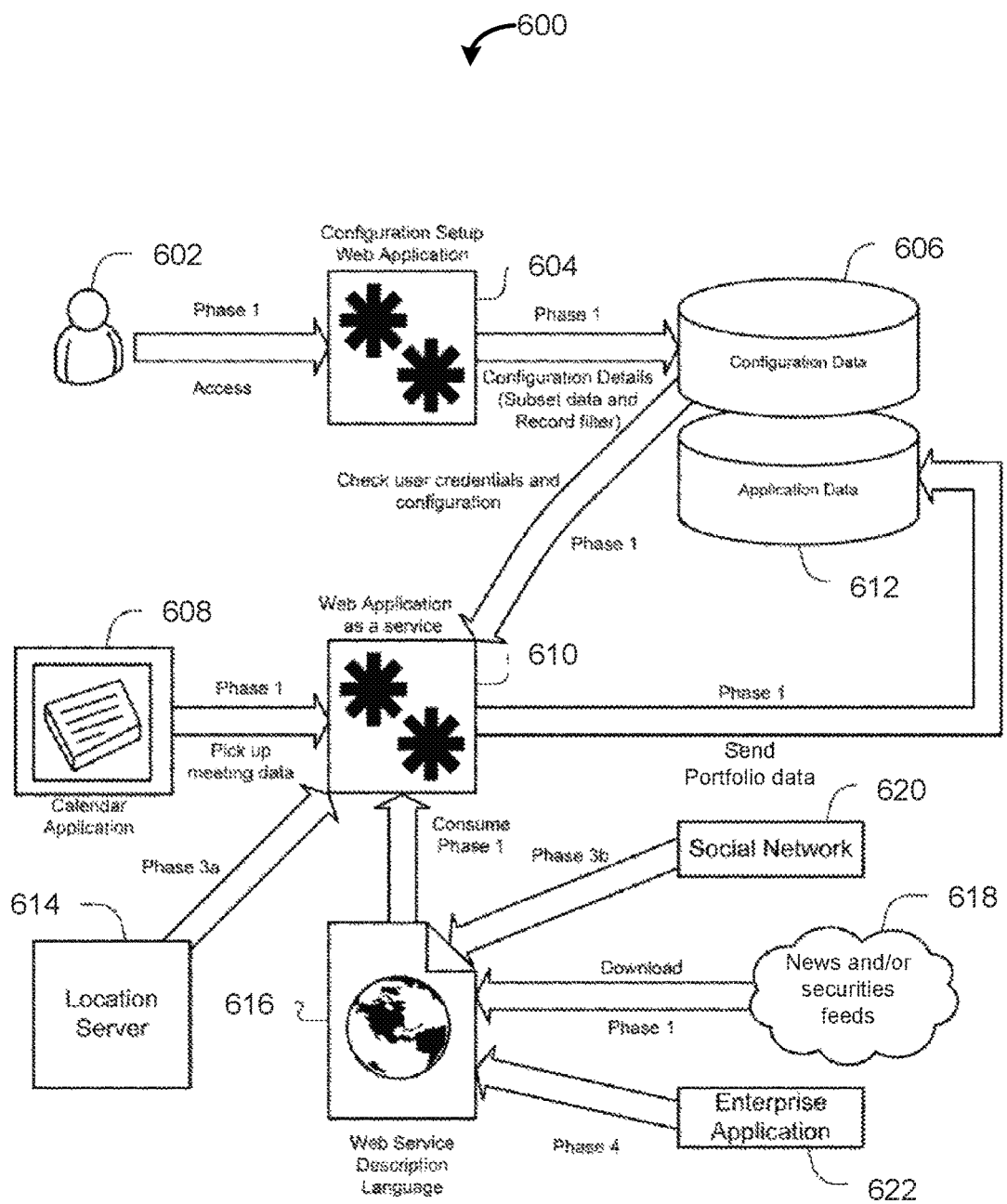
FIG. 6 illustrates one aspect of a system for providing real time context based information in an investment advisor application for investment advisors according to the disclosed embodiments.

FIG. 6 illustrates one aspect of a system 600 for providing real time context based information in an investment advisor application for investment advisors according to the disclosed embodiments. In the system 600 illustrated in FIG. 6, a method is directed to provide real time context based information in an investment advisor application. According to one aspect, in the system 600 a configuration setup-web application 604 is accessed by a user 602, which provides configuration details (subset data and record filter) to a local database 606. An investment advisor may review portfolio standings relevant to the client's portfolio. A web application-as-a-service 610 obtains meeting data from a calendar 608 such as an Outlook® calendar, for example. The web application-as-a-service 610 also obtains configuration data form the configuration database 606, a location server 614, and/or a web server 616. As illustrated in FIG. 6, the web server 616 may receive real time information over the cloud (Internet) from RSS feeds 618 (e.g., news feeds, securities feeds, etc.), a social network server 620 (e.g., Facebook®, Linkedin®, etc.), and/or enterprise application server 622. The web server 616 provides the information to the application-as-a-service 610 in the form of web service description language. The information received by the application-as-a-service 610 may be stored in an application database 612.

Figure 7:
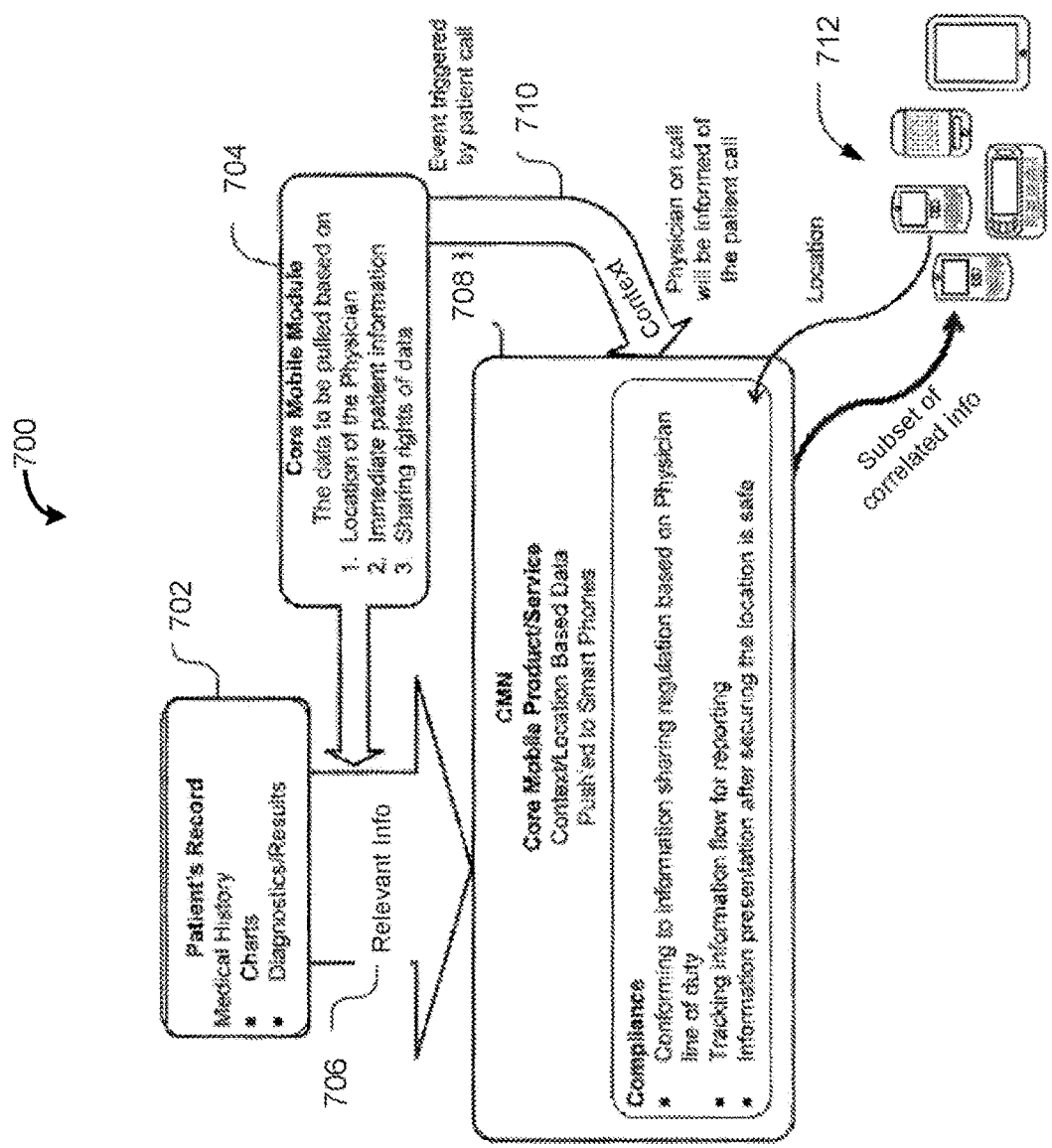
FIG. 7 illustrates one aspect of a system for providing real time context based information in a healthcare application according to the disclosed embodiments.

FIG. 7 illustrates one aspect of a system 700 for providing real time context based information in a healthcare application according to the disclosed embodiments. In the system 700 illustrated in FIG. 7, a method is directed to provide real time context based information in a healthcare application. According to one aspect, the system 700 is directed to healthcare providers (e.g., primary care physicians) receive relevant patient information 706 such as, for example, patient records, medical history, charts, diagnostic, results, symptoms, history of visits, drug information, and/or immunization information from an Electronic Medical Record (EMR) system 702. According to one aspect, the system 700 is directed to a health care application where a mobile product service application module 704 in a core mobile network determines a context 710 based on the location of the physician, the immediate patient information, and sharing rights of data. The mobile product service application 704 may determine relevant information 706 from the EMR system 702.

The mobile product service application 708 comprises a context based correlation engine (e.g., module) to correlate the relevant information 706 based on the context 710 match between the EMR system 702. In one aspect, the correlated data may be entered (e.g., stored) in a database. When a match for push criteria exists, the mobile product service application 708 provides a subset of the correlated information 718 to the mobile device 712 using a push delivery engine. The subset of the correlated information 718 may be pushed as specified in the push mechanism. A user may personalize the subset of the correlated information 718 being provided on the mobile device 712. The personalization may be based on fields available in the source (e.g., enterprise systems, cloud based services, social media and/ or RSS feeds) from which the relevant information 710 and 714 is retrieved.

In one aspect, this information may be obtained when the attending nurse takes a patient call and pages the physician. A module 704 determines a subset 706 of the patient information available from the EMR system 702 and pulls the subset 706 of information based on location of the physician, immediate patient information, sharing rights of data, among other basis, for example. In one aspect, a mobile product service application 708 in a core mobile network processes the subset 706 of information in a context 710 based on an event triggered by a patient call to the physician office where the physician on call will be informed of the patient call. In one aspect, the method includes a compliance mechanism to ascertain privacy of the patient information based on identification of the mobile device 712, user, and location in addition to ascertaining compliance requirements in accordance with regulations set forth by the Health Insurance Portability and Accountability Act (HIPAA). The HIPPA regulations require tracking of patient private data as it moves from a secure EMR system to a mobile device (handset) and deletion of the same on the mobile device 712 (handset) after recording the person who viewed the information. In another aspect, a method is directed at medical device vendors to extract real patient data from the medical device in the field, correlate the information with patient's electronic medical record data and push new settings to the device from the cloud based system.

Figure 8:
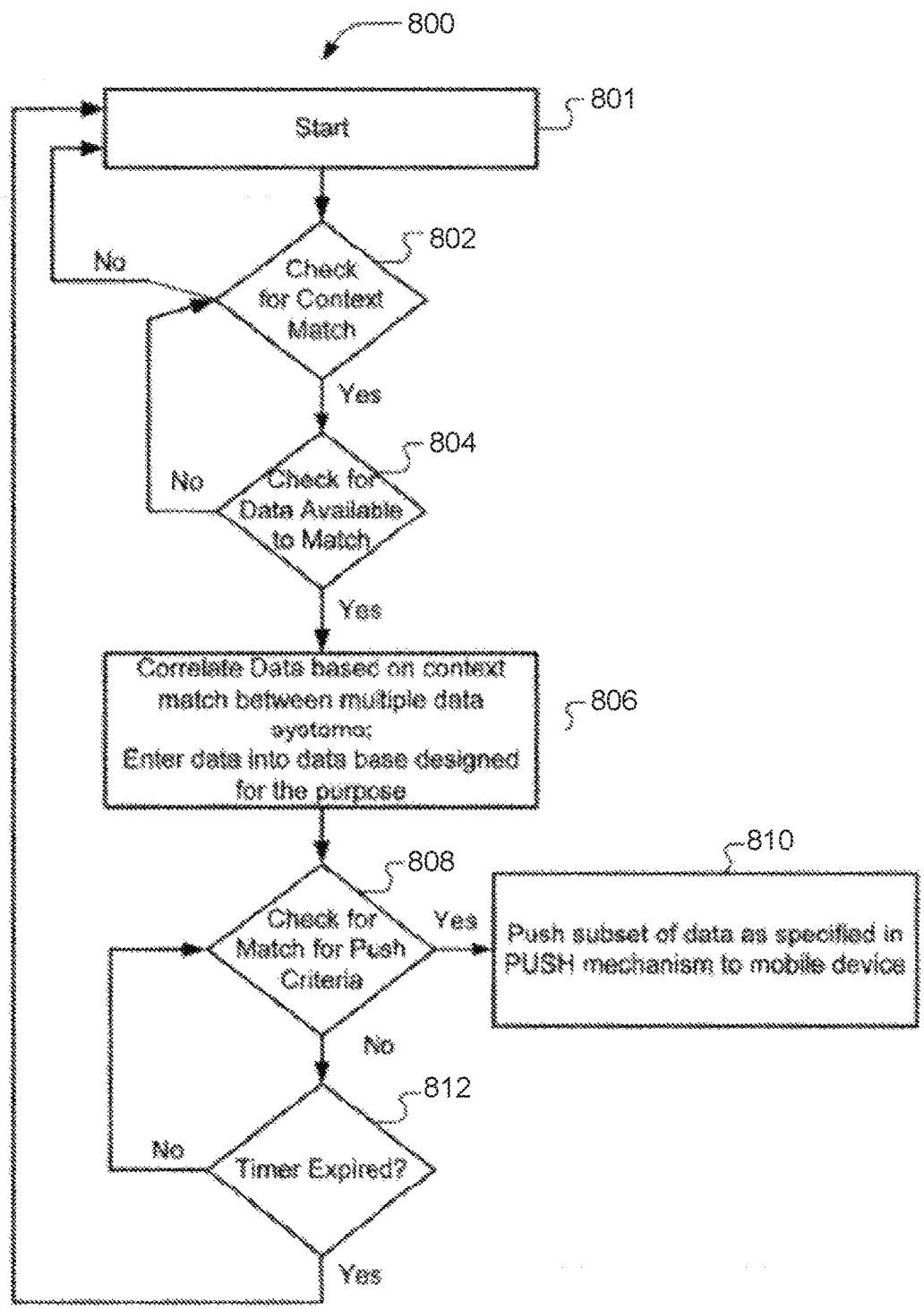
FIG. 8 is a logic diagram of one aspect of a context based subset and correlation engine integrated with push engine according to the disclosed embodiments.

FIG. 8 is a logic diagram 800 of one aspect of a context based subset and correlation engine integrated with push engine according to the disclosed embodiments. With reference now to the logic diagram 800, at 801, the process waits for an event trigger. When an event trigger occurs, at 802 a context based correlation engine component of a mobile product service application according to the disclosed embodiments checks for a context match. In one aspect, a context may be determined, for example, based on a location of a mobile device, calendar entry in Outlook® or mobile device, both location of mobile device and calendar entry, route point match, doctor page from a patient call, or a passenger and flight alert. When a context match is found, the process continues along the "Yes" path to check for data available to match at operation 804 otherwise the process continues along the "No" path to 801 to wait for the next event trigger. At 804, the data available to satisfy the context match across multiple data systems is determined, for example, based on information available at servers accessible through the cloud (Internet) such as salesforce.com or salesgenie.com for field sales applications; servicemagic.com or servicemax.com for field service applications; getload.com or 123loadboard.com for trucking applications, patient information from electronic medical records systems for healthcare applications, and/or flight departure match from flight information system for airline industry applications. When data is available to match at 804, the process continues to 806 along the "Yes" path to correlate the data based on the context match between the multiple data systems. In one aspect, the data may be entered into a database designed for the purpose. When data is not available to match at 804, the process continues to 802 to check for context matches. At 808, the process checks for a match for push criteria. When a match is found, the process continues along "Yes" path to 810 to push a subset of data as specified in the PUSH mechanism to the mobile device. A push delivery engine component of the mobile product service application according to the disclosed embodiments may be used to push the subset of data to the mobile device. From here, the process continues to 801 and waits for the next event trigger. When there is not match for push criteria the process proceeds along "No" path to determine whether a timer has expired 812 and continues to check for a push criteria match until the timer expires. The process then continues along "Yes" branch to 801 to wait for the next event trigger.

Figure 9:
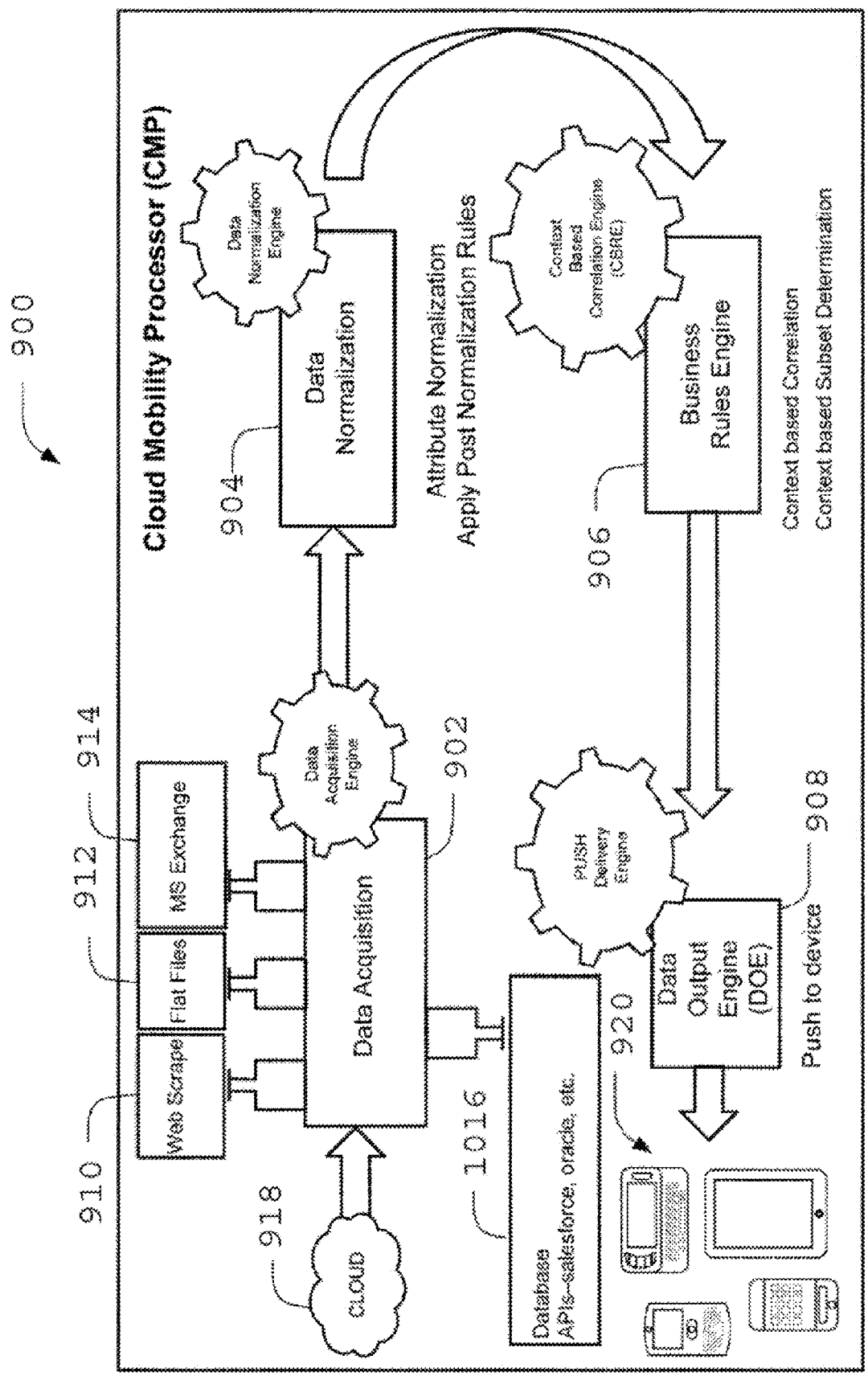
FIG. 9 illustrates one instance of one aspect of a system for real time delivery of context based information.
Figure 10:
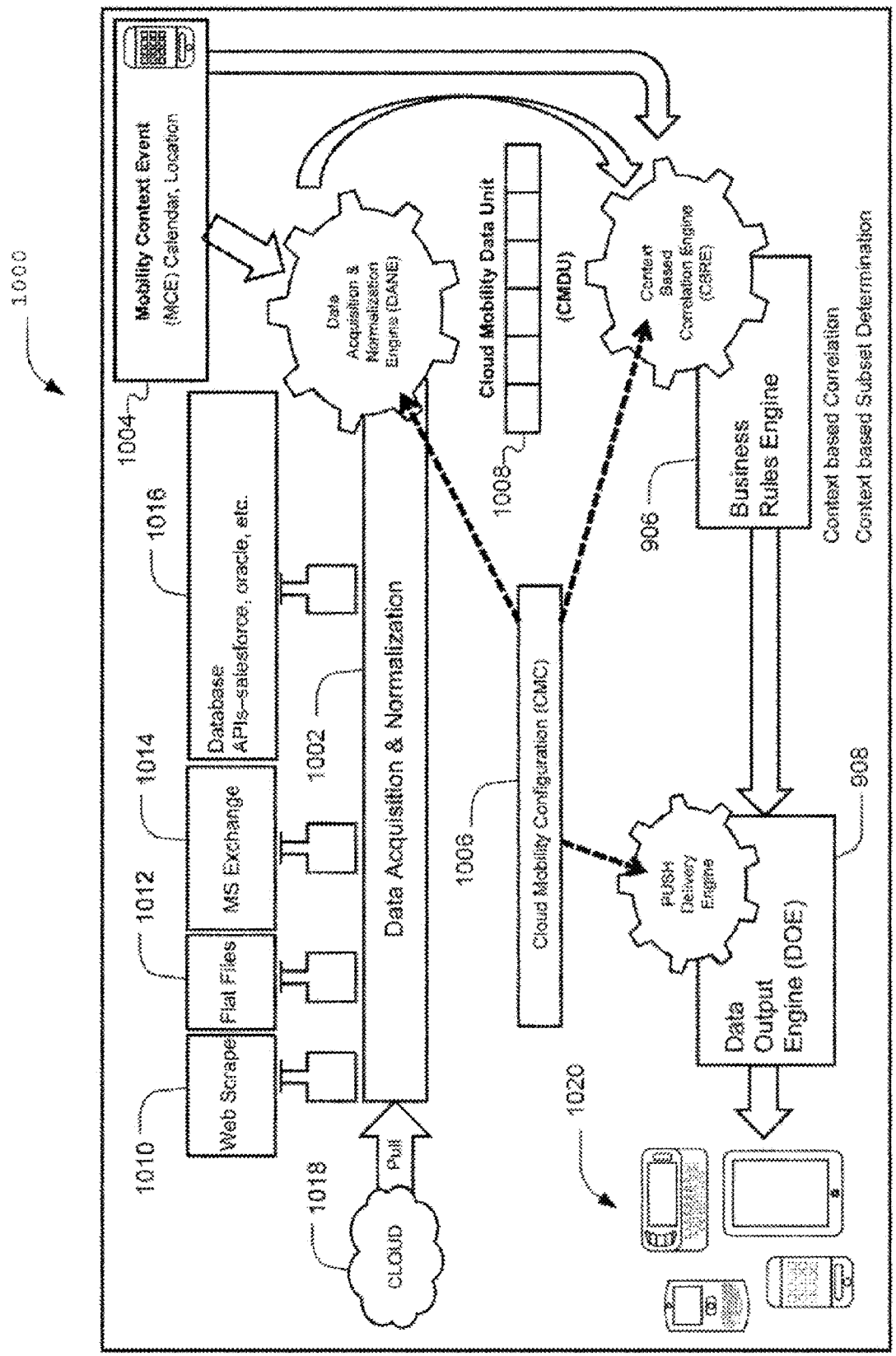
FIG. 10 illustrates one aspect of a cloud mobility processor (CMP) for real time delivery of context based information similar to the CMP with the data acquisition and data normalization modules are combined as a single data acquisition and normalization module (DANE).

FIG. 9 illustrates one instance of one aspect of a system 900 for real time delivery of context based information. Each instance of the system 1000 is referred to as a cloud mobility processor (CMP). In one general aspect, the CMP 1000 is a context based information correlation engine that operates similar to log and data correlation engines used by event correlation systems and further employs real time live data from multiple systems on the Internet (cloud 1018) with one or more contexts to correlate and determine a subset. As shown in FIG. 10, there are four software modules (or engines) included as part of the CMP 1000: a data acquisition engine 1002, a data normalization engine 1004, a business rules engine 1006 (BRE), and a data output engine 1008 (DOE).

The data acquisition engine 902 obtains data from the cloud 918 using multiple methods such as, but not limited to, scraping of web pages 910, reading from flat files 912, reading from calendar entries 914 such as Microsoft® Exchange enterprise servers, reading from Mobile Device servers, and reading from databases 1016 and web services such as software-as-a-service (SaaS) applications such as, for example, salesforce.com, SAP, Oracle.

The data normalization engine 904 performs attributes normalization such that data obtained from different sources can be saved in a database. The data normalization engine 904 also applies post normalization rules (if any) such that data is made available for context based correlation, and context based subset determination. For practical purposes of implementation and improvement in efficiency, in one aspect, the data acquisition 902 and data normalization 904 modules are combined as a single module as shown in FIG. 10 below.

Turning back now to FIG. 9, the business rules engine 906 performs, tracking of mobile user contexts such as sessions and locations, data transformations such as aggregation of multiple SaaS data sources, context based correlation, and context based subset determination. At a high level, the BRE 906 tracks user context based on location of the user and where the user sessions are located. The BRE 906 performs data transformations on various aggregations of information that is received from multiple sources such as software-as-a-service (SaaS), web locations like salesforce.com, salesgeni.com, LinkedIn.com, SAP, Siebel, airline reservations systems, patient information systems. The BRE 906 correlates the data received from multiple sources.

In a field sales application of real time delivery of context based information may be employed by a field sales person who wants to correlate the information located in the company database to the information provided by salesforce.com, which includes sales leads generated by salesgeni.com. Also, the current contacts of the sales person may be associated with the current location of the sales person and, in one example, up to a quarter mile radius of the current location. The various sales targets may be correlated with the information from salesgeni.com and salesforce.com to see which one to target first. Other contacts may be correlated to the upcoming scheduled meetings and based on that the BRE 906 can extract information from the salesforce.com and correlate to salesgenie.com other sales targets at the same account. That information is correlated and pushed to the mobile device of the sales person. The BRE 906 provides contact-based correlation and performs a contact-based subset determination. The subset determination displays the data on a really small display on a mobile device such as a smartphone. Following the BRE 906 is the DOE 908.

The data output engine 908 delivers the context based correlation information to a mobile device or multiple mobile devices 920 based on a context based content push to the mobile device or multiple mobile devices 920. The DOE 908 takes the context based information which has been determined by the BRE 1006 and pushes it to the applicable mobile device(s) 920. The DOE 908 tracks the configuration of the mobile device 920, it determines a pushing engine for the mobile device 920, and then applies a predetermined set of rules for that pushing engine to push the data to the mobile device(s) 920.

FIG. 10 illustrates one aspect of a cloud mobility processor 1000 (CMP) for real time delivery of context based information but with the data acquisition 1002 and data normalization 1004 modules are combined as a single data acquisition and normalization module 1002 (DANE). The DANE 1002 is invoked with the occurrence of a mobility context event 1004 (MCE). In one aspect, the system 1000 may comprise two MCEs 1004—a calendar entry in Microsoft® Exchange server or mobile device 1020, and a location of the mobile device 1020. The DANE 1002 pulls data from the appropriate source using mechanisms like web scraping 1010, flat files on disks 1012, enterprise application servers 1014 like Microsoft® Exchange or from databases 1016 using APIs to salesforce.com, salesgenie.com, Oracle Siebel, SAP, ServiceMagic, Getloaded.com, airline passenger systems, or electronic medical record systems, among others, for example.

In one aspect, the DANE 1002 may be implemented as a generic module that is configured using cloud mobility configuration 1006 (CMC) source. The CMC 1006 provides business vertical specific information where this SaaS is being deployed. For example, one specification of the CMC 1006 can be used to configure the DANE 1002 (and the CMP 1000) for salesforce.com (or salesgenie.com) and will be different from that for healthcare providers electronic medical record systems, for example. The output of the combined DANE 1002 is a cloud mobility data unit 1008 (CMDU). The CMDU 1008 is a normalized form of extracted data objects.

The information is acquired from the cloud 1018 by the DANE 1002 is provided (passed on) to the BRE 906 in a data unit (packet) referred to as a the CMDU 1008, which is essentially the output of the DANE 1002 and the input to the BRE 906, so that business rules can be applied to the data received from the cloud 1018. Thus, the CMDU 1008 is the key data that is generated within the CMP 1000. Accordingly, the CMDU 1008 enables the CMP 1000 to receive data from multiple sources, normalize the data to a format that the BRE 906 can actually act upon to generate the context based information and to perform a context-based correlation near the context-based subset.

The DANE 1002 processes asynchronous and heterogeneous MCEs 1004 and generates homogeneous CMDUs 1008. The CMDUs 1008 are queued up for processing by the BRE 906 to perform correlation of data in multiple CMDUs 1008 and determine a context based subset of information and puts in the queue for the DOE 1008 to act on it to push the data to the mobile device 1020. The DOE pushes the data output from the CMDUs 1008 based on fields that need to be pushed based on the entries in the configuration file.

The CMC 1006 specifies the basis of operation of all three engines as an XML schema. Each vertical application that is being mobilized has a separate CMC 1006 which is generated dynamically based on configuration options chosen by the user from the web interface to SaaS to mobilize the cloud. For example, at start up, the DANE 1002, BRE 906, and DOE 908 engines of the CMP 1000 require certain initialization guidelines based on what rules to employ. Such initialization guidelines are provided in the CMC 1006 file. The CMC 1006 is an XML schema that provides operational details regarding the DANE 1002, BRE 906, and DOE 908 engines. The CMC 1006 enables the CMP 1000 to be applied to various business environments like field sales, field service, airlines, healthcare, pharmaceuticals, financial, business intelligence, among others. When the CMP 1000 is applied to different business environments, what changes are the data and the CMC 1006 sections.

A sample CMC 1006 specified in XML is shown below.

```
<?xml vercion-"1.0" encoding-"UTF-8"?>
<!-- New document created with EditiX at Sun Nov 07 17:35:07
PST2010 -->
<CMP>
<Common>
<!-- Specify configuration parameters common to all 3 engines for
this specific Cloud Mobile Processor -->
</Common>
<DANE>
<!-- Specify configuration parameters specfic to Data Acquisition 4
Normalization Engine -->
</DANE>
<BRE>
<!-- Specify configuration parameters specific to Business Rules
Engine -->
<!-- Specify Correlation Engine & Subset Determination Parameters -
->
</BRE>
<DOE>
<!-- Specify configuration parameters specific to Data Output Engine
-->
<DOE>
<CMDUschema>
<!-- Specify CMU schema to use with this CMP -•>
</CMDU schema>
</CMP>

<CMDUschema>
<name>
Salesforce
</name>
<name>
Salegenie
</name>
<name>
Getloaded
</name>
<name>
OpenMRS
<name>
<name>
AlaskaAirlines
</name>
</CMDUschema>
```

The XML schemas for the CMDUs 1008 are defined separately such that the CMDUs 1008 are leveraged across multiple cloud based applications and services being mobilized. The CMC 1006 leverages XML to define hierarchical rules in the hierarchical BRE 1006 and parameters for context based correlation and context based subset determination.

The CMDU 1008 is transmitted to the BRE 906. The BRE 906 performs context-based correlation of CMDUs 1008 and determines a subset from the CMDUs 1008 based on the information defined in the CMCs 1006. As described above, the CMC 1006 is a configuration file that has an entry for particular business to be applied by the BRE 906. The CMC 1006 is formatted to includes a section with parameters that are common to all three engines (DANE 1002, BRE 906, DOE 908). Additionally, the CMC 1006 includes parameters specifically tailored for the DANE 1002, parameters specifically tailored for the BRE 906, and parameters specifically tailored for the DOE 908. After the BRE 906 reads such parameters (common and specific) from the CMC 1006, it waits for the DANE 1002 to pass the data to it in the form of a CMDU 1008 and then the BRE 906 applies the specific business logical rules to the CMDU 1008. The BRE 906 employs certain format of business rules and logic rules that are applied to the CMDU 1008 for various execution paths. In summary, the BRE 906 comprises business logic rules. The business logic rules are defined as rule execution paths because the same rule can be applied in multiple ways. So if PAT formed one type of data it would be different based on which particle of rules are being used in that PAT. The rules are very generic. Finally, the path through the rules depends on the particular business application as defined by the CMC 1006.

Figure 11:
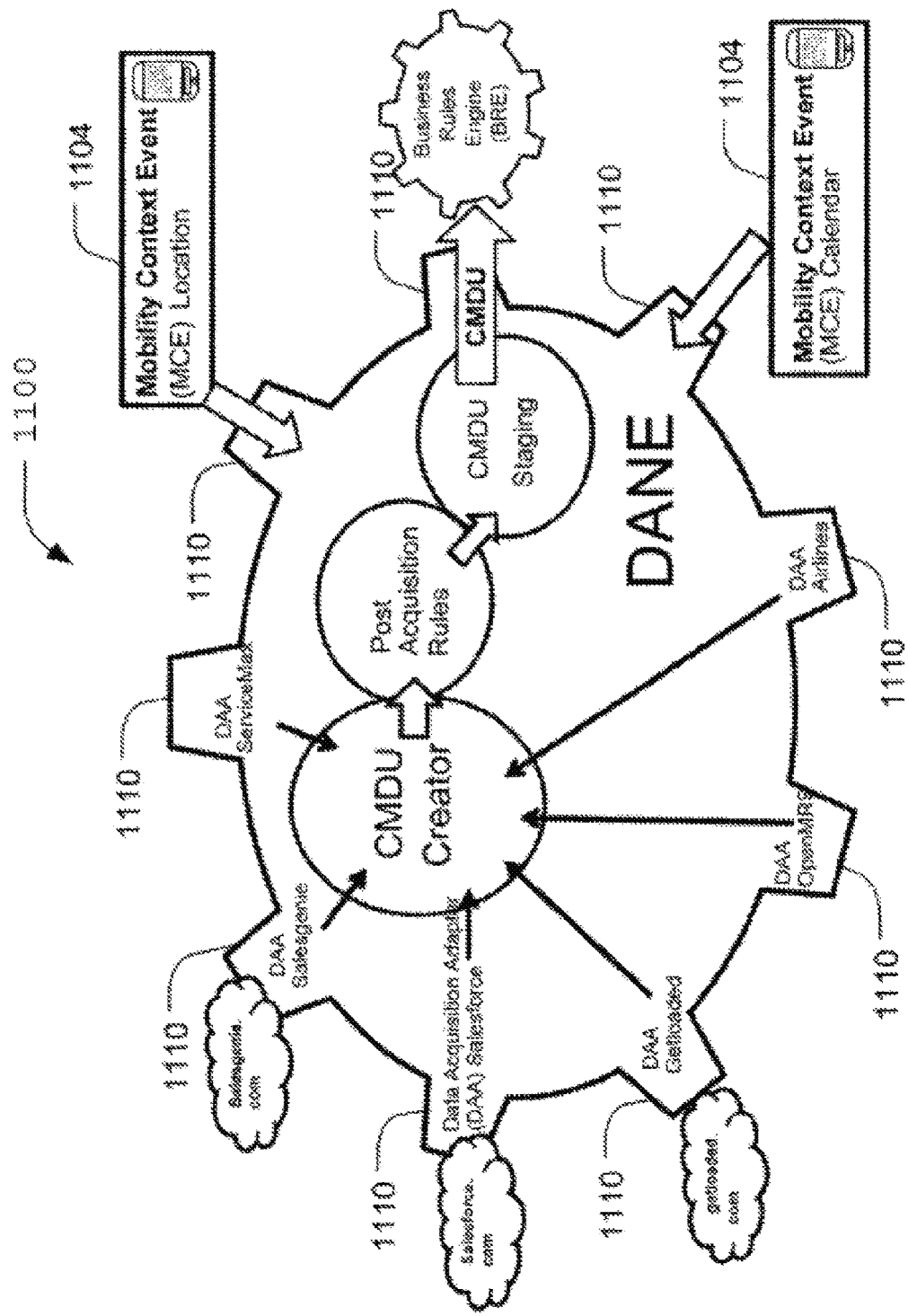
FIG. 11 is a block diagram of one aspect of a DANE.

FIG. 11 is a block diagram 1100 of one aspect of a DANE. As stated earlier the DANE receives specifications from the CMC and gets information from various applications and cloud based services using data acquisition adaptors 1110 (DAA). The DANE is triggered into action by occurrence of an MCE 1004. As shown, there may two MCEs 1104 are supported, calendar entry and location of the mobile device, although others are contemplated by the present disclosure. The DANE uses the DAAs 1110 to receive data from multiple sources in the cloud and select enterprise applications and produces CMDUs as output. The CMDUs are then processed by the BRE.

Figure 12:
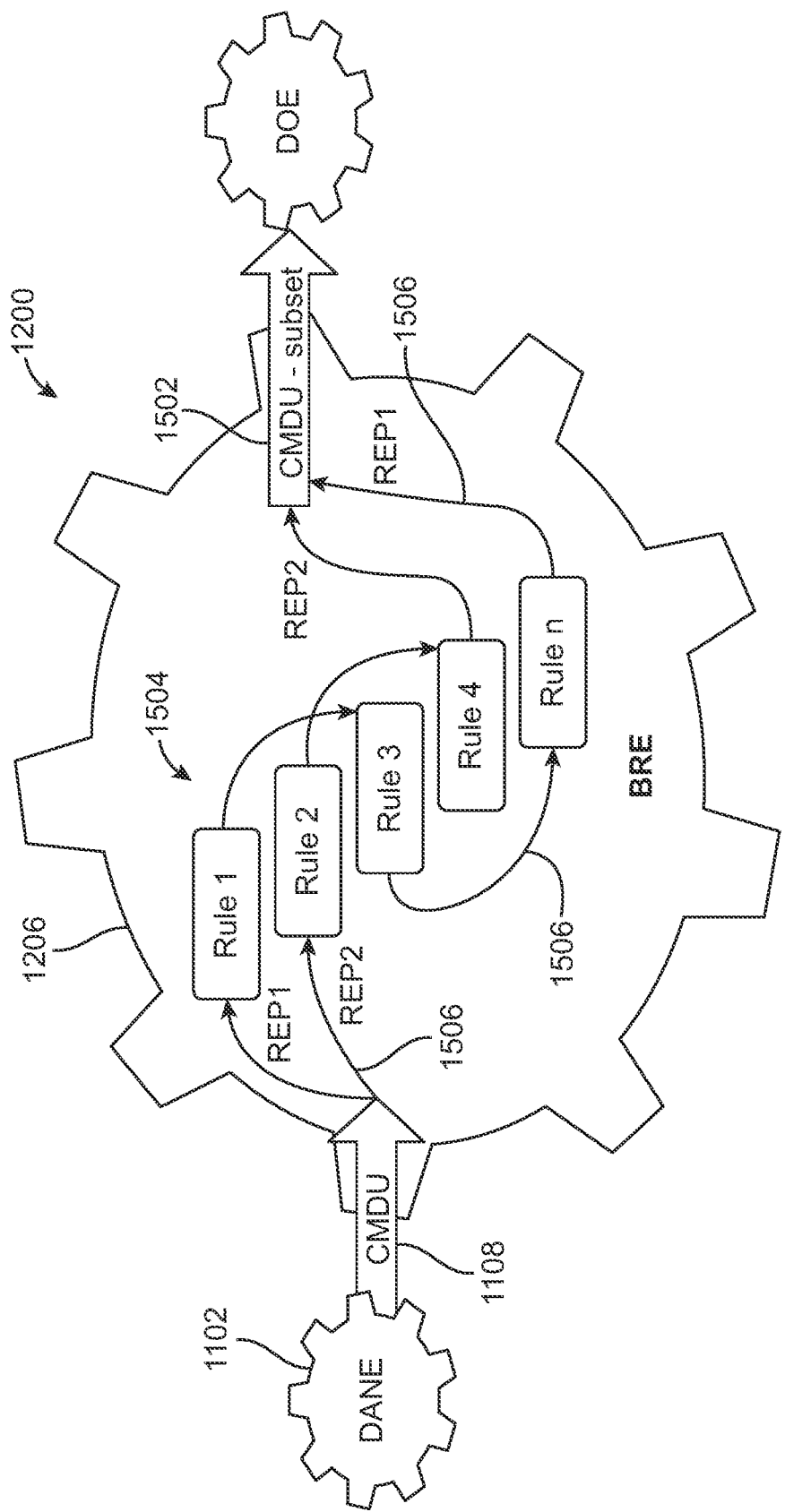
FIG. 12 is a diagram of one aspect of a business rules engine (BRE).

FIG. 12 is a diagram 1200 of one aspect of a BRE 1206. In one aspect, the BRE 1206 performs context based correlation of data in the CMDUs 1108 and determines "subsets of information" 1502 (e.g., CMDU-subset) from the CMDUs 1108 based on information from the CMC 1106. The context is obtained by the BRE 1206 as MCEs 1104 are processed by the DANE 1102 and passed onto the BRE 1206 at the same time to be ready to process the CMDUs as they are made available by the DANE 1102. The BRE 1206 comprises one or more business logic rules 1504-1, 1504-2, 1504-n (BLR) arranged in one or more rule execution paths 1506-1, 1506-2, 1506-m (REP). Typically, each REP 1506 corresponds to one MCE 1104, but the disclosure is not limited as such.

Some examples of business logic rules are certain mathematical functions, string manipulation functions, flow control, mapping from one-to-one or -two from ranges or aggregation, among others. If data is received from a ".com" as a contact person on a, the data can be extracted from the link provided for that particular contact, which may assist a sales person or a field sales person understand a target customer in more detail, for example. The data received from salesforce.com or from salesgeni.com can be correlated and combined according to the particular business rules. Data from airline reservations systems also can be combined. For example, when the flight is scheduled and the passenger is ready to get on a certain plane, a message is sent (pushed) to the passenger mobile device with the particular flight information such as departure time, gate, and the like. In addition, other information may be delivered or pushed to the passenger mobile device that includes the current location of the passenger, the driving time to the airport, destination, and the like. And as the passenger gets to the airport close additional information such as restaurants and information about the restaurants may be pushed to the passenger mobile device, from which the airlines may be able to generate additional advertising revenue.

What is claimed is:

1. A method comprising:
    establishing a first context for a user to start a process of correlation of information from multiple sources of information;
    revising the first context to generate a second context, based on first information, wherein the second context does not comprise data from the first context, and wherein the first information comprises a workflow that is generated based at least in part on information received from the multiple sources of information according to the first context;
    correlating the multiple sources of information based on the second context to generate second information;
    receiving an indication of a pertinent subset of information of the second context from the user;
    filtering the second information generated for the user from correlation of the multiple sources of information based on the second context to determine a subset of information based on an identification of the user and the indication of the pertinent subset of information identified by the user;
    sending the subset of information to a client device associated with the user.

2. The method of claim 1, further comprising applying department-level access policies to authenticate the user.

3. The method of claim 1, further comprising applying department-level access policies to authorize the user.

4. The method of claim 1, wherein the one or more sources of information include enterprise systems, cloud-based sources, social media, IT administration systems, RSS feeds, a phone system.

5. The method of claim 1, further comprising requesting the first information from the one or more sources of information based on the first context.

6. The method of claim 1, wherein the first context comprises a subject of a calendar entry of the user, an attendee associated to the calendar entry of the user, a GPS location of the client device, a caller identification of an incoming phone call to the client device, a caller identification of an outgoing phone call from the client device, information regarding a web conference, financial information regarding a market being tracked by the user, or a to do list.

7. The method of claim 1, further comprising providing the user with access to an application associated with the subset of information.

8. The method of claim 1, wherein the workflow includes one or more activities that need to be performed and the order in which the activities need to be performed in achieving a goal.

9. The method of claim 8, wherein the indication of the pertinent subset of information of the second context received from the user is indicative of completion of at least one of the activities.

10. A system comprising:
    a data acquisition engine configured to receive first information from multiple sources of information;
    a context-based correlation engine configured to:
        establish a first context for a user to start a process of correlation of information from the multiple sources information,
        revise the first context to generate a second context based on first information, wherein the second context does not comprise data from the first context, and wherein the first information comprises a workflow that is generated based at least in part on information received from the multiple sources of information according to the first context,
        correlate the multiple sources of information based on the second context to generate second information,
        receive an identification of a pertinent subset of information of the second context from the user, and
        filter the second information generated for the user from correlation of the multiple sources of information based on the second context to determine a subset of information based on an identification of the user and the indication of the pertinent subset of information identified by the user; and
    a push engine configured to send the subset of information to a client device associated with the user.

11. The system of claim 10, the data acquisition engine being configured to apply department-level access policies to authenticate the user.

12. The system of claim 10, the data acquisition engine being configured to apply department-level access policies to authorize the user.

13. The system of claim 10, wherein the one or more sources of information include enterprise systems, cloud-based sources, social media, IT administration systems, RSS feeds, or a phone system.

14. The system of claim 10, the data acquisition engine being configured to request the first information from the one or more sources of information based on the first context.

15. The system of claim 10, wherein the first context is established based on a GPS location of the client device, or a healthcare procedure associated with the pertinent subset.

16. The system of claim 10, further comprising a communication engine configured to provide the user with access to an application associated with the relevant subset of information.

17. The system of claim 10, further comprising a datastore configured to store the workflow.

18. The system of claim 10, wherein the workflow includes one or more activities that need to be performed and the order in which the activities need to be performed in achieving a goal.

19. The system of claim 18, wherein the workflow is used to predict or schedule one or more future healthcare procedures.

20. The system of claim 10, wherein the context-based correlation engine is further configured to perform historical and predictive analysis to predict a capacity or efficiency of providing healthcare services.

21. The system of claim 18, wherein the indication of the pertinent subset of information of the second context received from the user is indicative of completion of at least one of the activities.

* * * * *